United States Patent [19]
Matsui

[11] Patent Number: 5,825,546
[45] Date of Patent: Oct. 20, 1998

[54] "MACRO" PHOTOGRAPHIC LENS HAVING LONG FOCAL LENGTH AND VIBRATION COMPENSATION

[75] Inventor: Sei Matsui, Chiba, Japan

[73] Assignee: Nikon Corporation, Tokyo, Japan

[21] Appl. No.: 781,083

[22] Filed: Jan. 9, 1997

[30] Foreign Application Priority Data

Jan. 12, 1996 [JP] Japan ................................ 8-022017

[51] Int. Cl.⁶ ........................... G02B 27/64; G02B 15/14
[52] U.S. Cl. ........................... 359/557; 359/554; 359/686
[58] Field of Search ................... 559/554–557, 559/676–677, 680–686, 771, 779; 396/52–55, 72

[56] References Cited

U.S. PATENT DOCUMENTS

| | | | |
|---|---|---|---|
| 5,249,079 | 9/1993 | Omeda | 359/557 |
| 5,402,268 | 3/1995 | Tatsuno | 359/686 |
| 5,477,297 | 12/1995 | Suzuki | 396/52 |
| 5,490,014 | 2/1996 | Suzuki | 359/557 |
| 5,585,966 | 12/1996 | Suzuki | 359/554 |

FOREIGN PATENT DOCUMENTS

| | | |
|---|---|---|
| 55-140810 (A) | 11/1980 | Japan . |
| 61-132916 (A) | 6/1986 | Japan . |
| 62-42252 (A) | 9/1987 | Japan . |
| 2-81014 (A) | 3/1991 | Japan . |
| 5-323191 (A) | 12/1993 | Japan . |
| 7-261126 (A) | 10/1995 | Japan . |
| 7-261127 (A) | 10/1995 | Japan . |

*Primary Examiner*—Thong Nguyen
*Attorney, Agent, or Firm*—Klarquist Sparkman Campbell Leigh & Whinston, LLP

[57] ABSTRACT

Macro telephoto lenses are disclosed for photographic use and that have a vibration compensation. The lenses have a relatively long focal length (as telephoto lenses), having a field of view of about 18° or less and an F number of at least 4. Focusing is from infinity to a reproduction ratio of at least 1/2 and preferably 1/1 or more. The vibration compensation feature comprises at least one "antivibration lens element" in a lens group that is stationary in the direction of the optical axis. The antivibration lens element is operable to be transversely moved relative to the optical axis to counteract the effect of vibration and/or lens movement during photography. The lens preferably comprises a first positive lens group, a second positive lens group, a third negative lens group, and a fourth positive lens group. The first and third lens groups are preferably movable on the optical axis during focusing, and the second and fourth lens groups are preferably stationary in the direction of the optical axis during focusing. The lens preferably fulfills several conditional expressions.

13 Claims, 24 Drawing Sheets

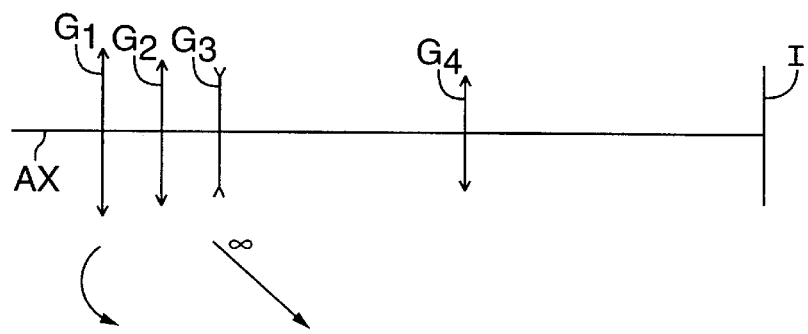
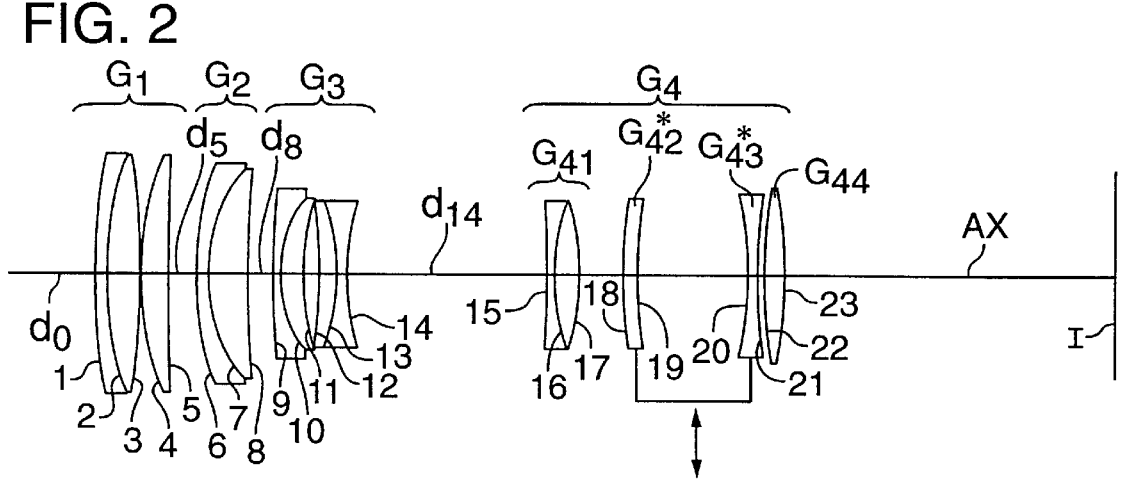

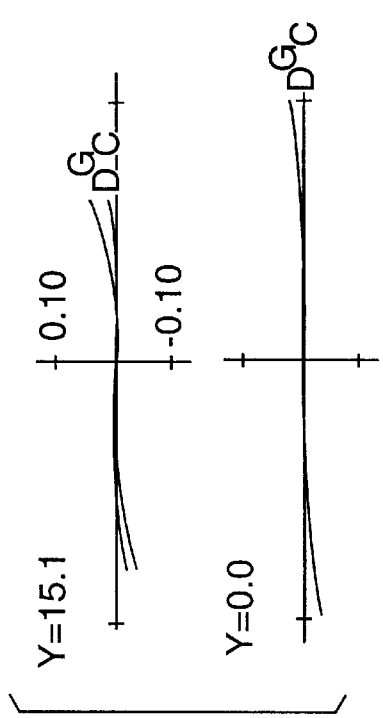
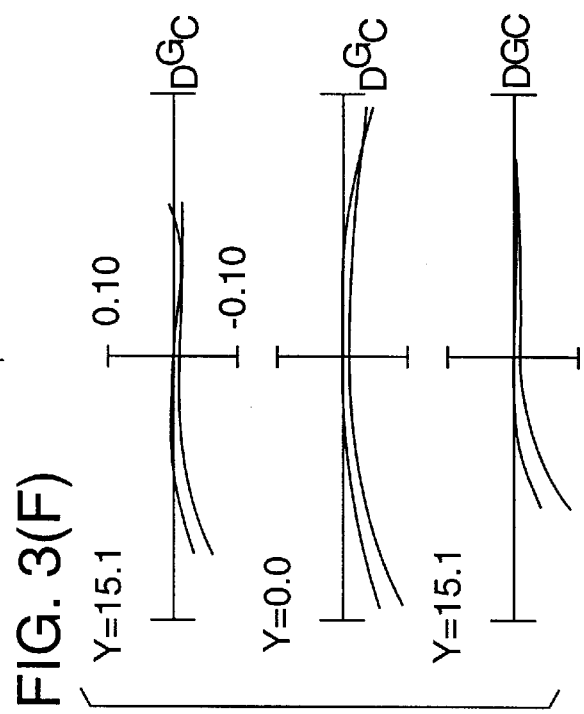
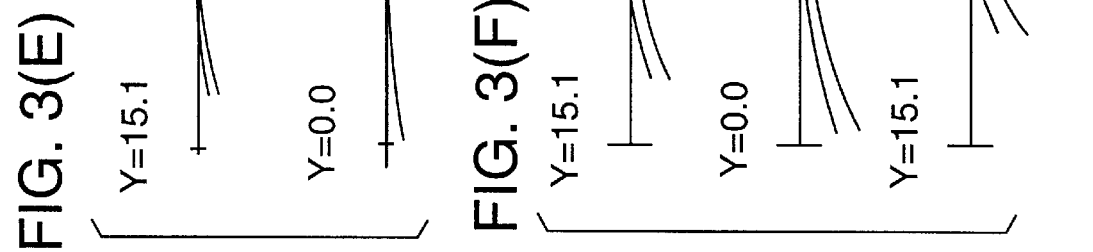
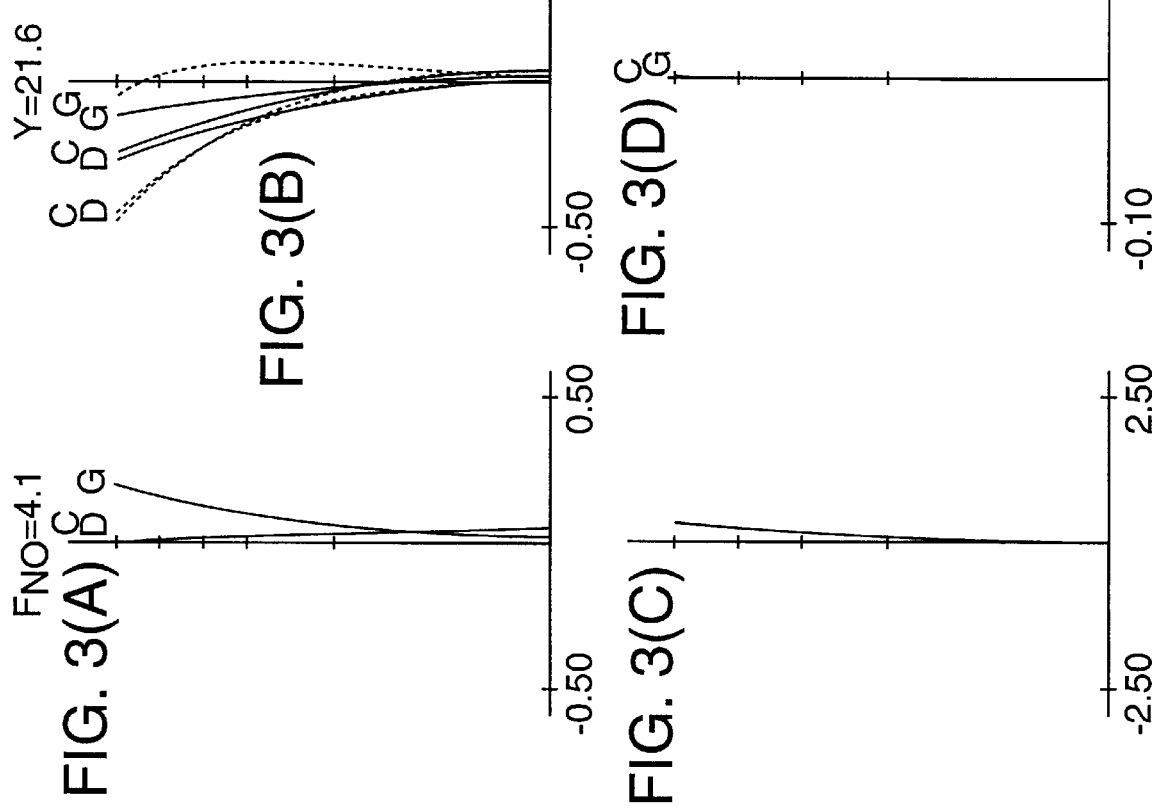

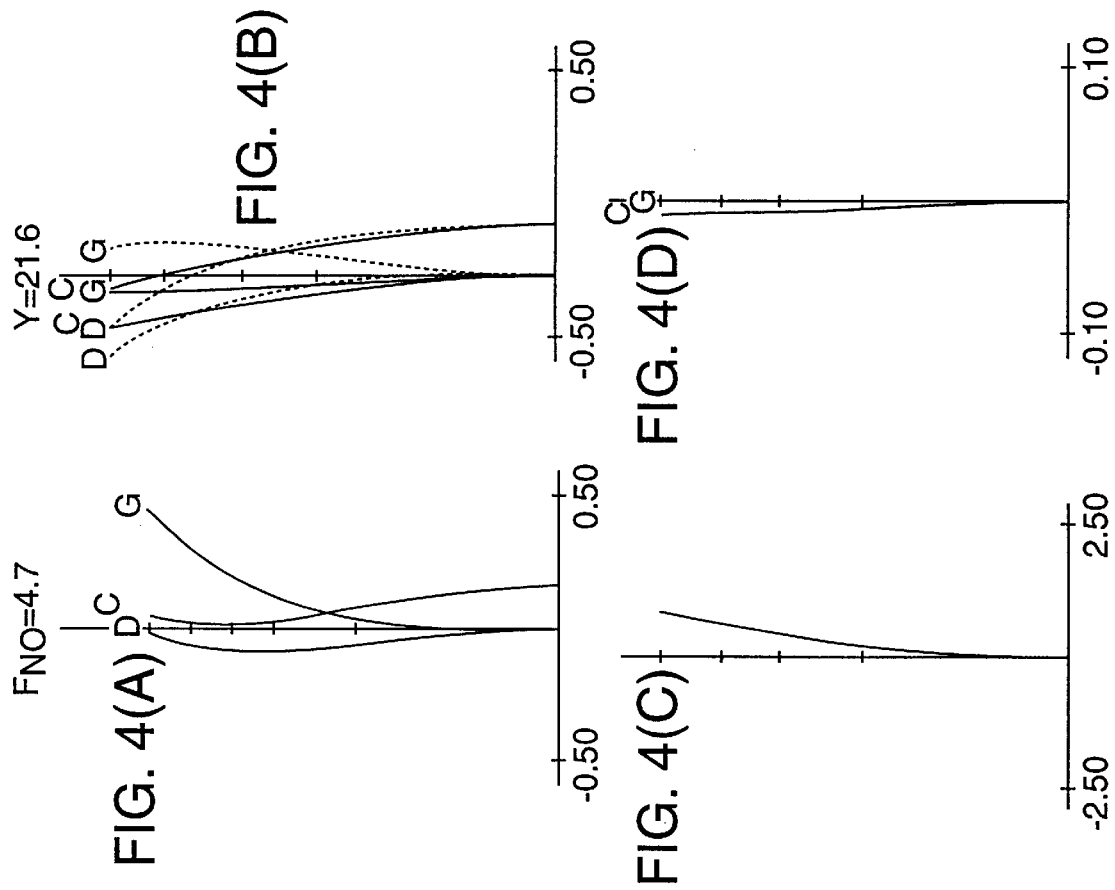

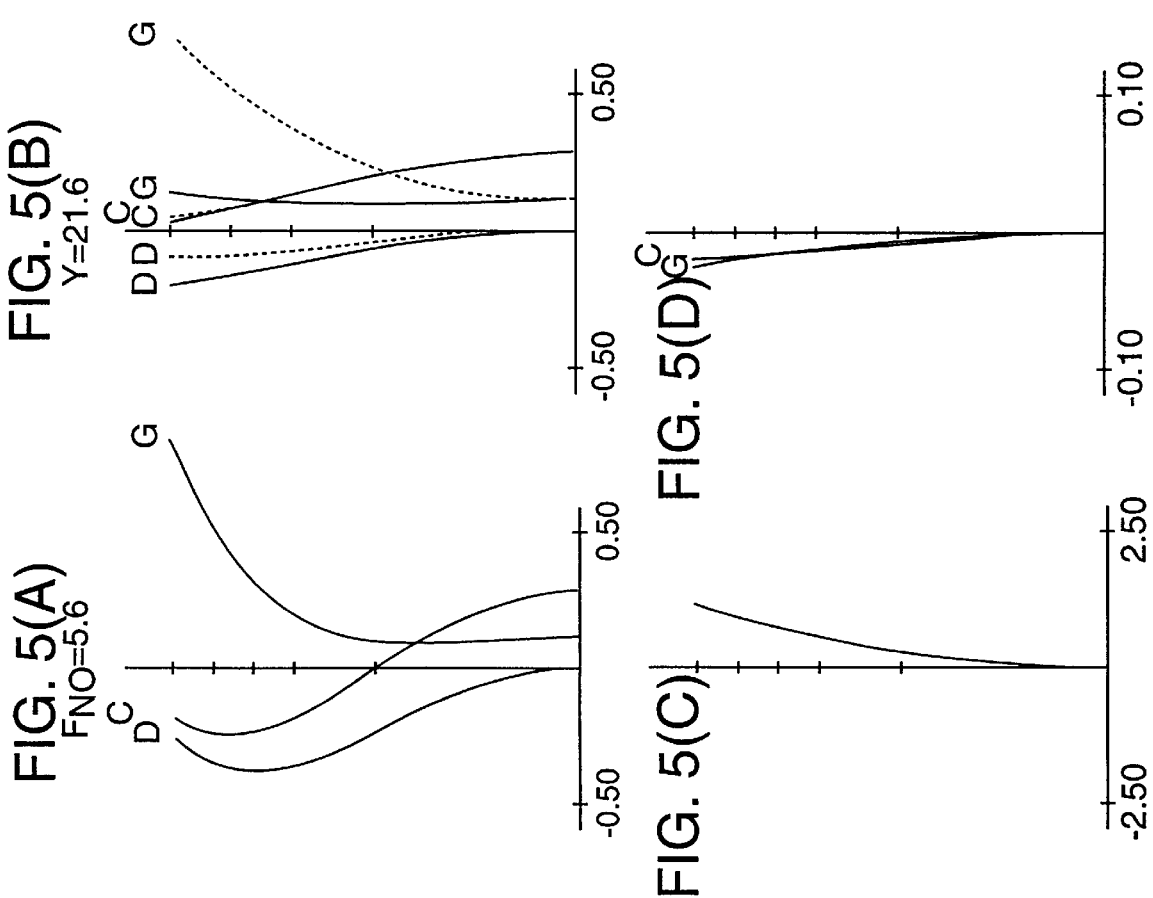
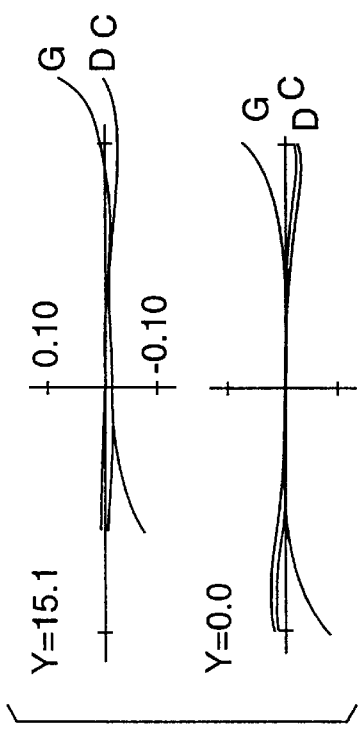
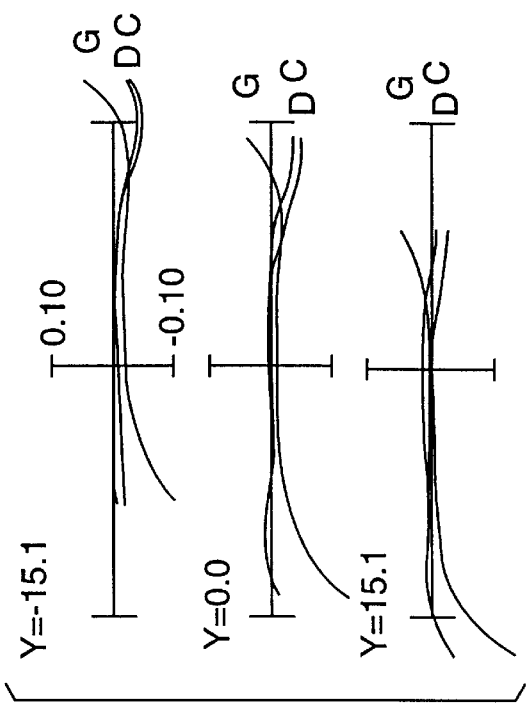

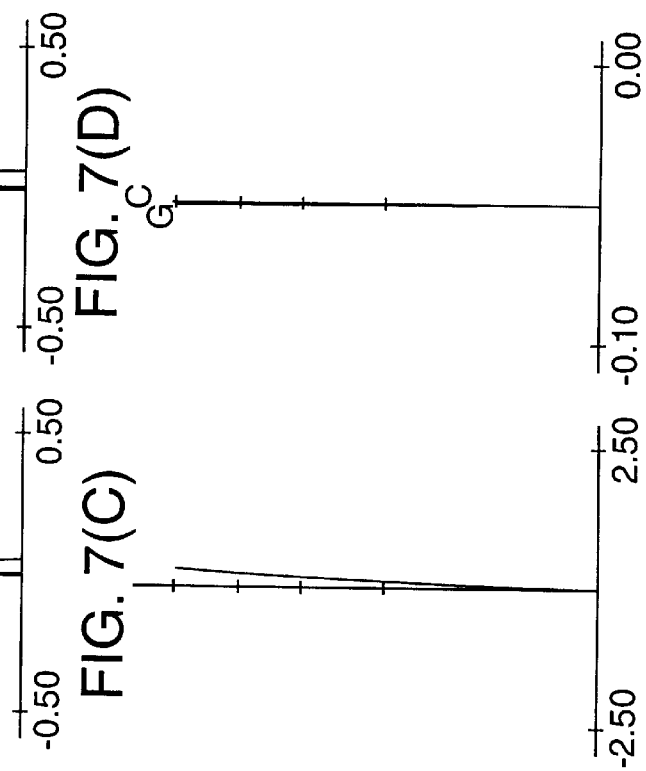

FIG. 8(A) FNO=4.7

FIG. 8(B) Y=21.6

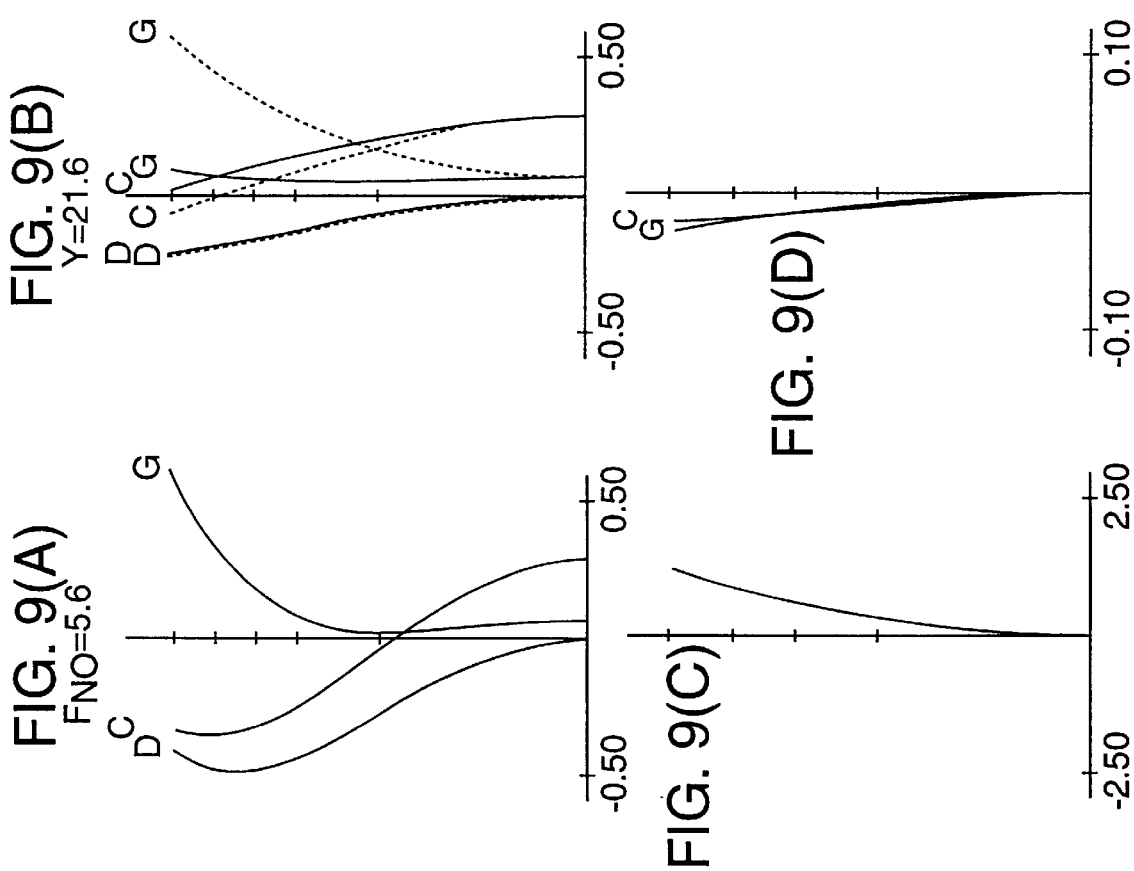

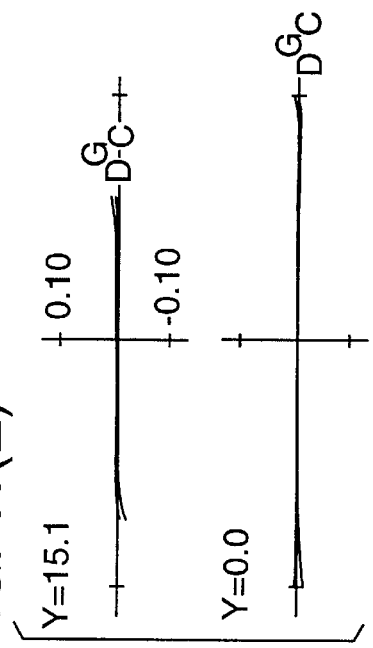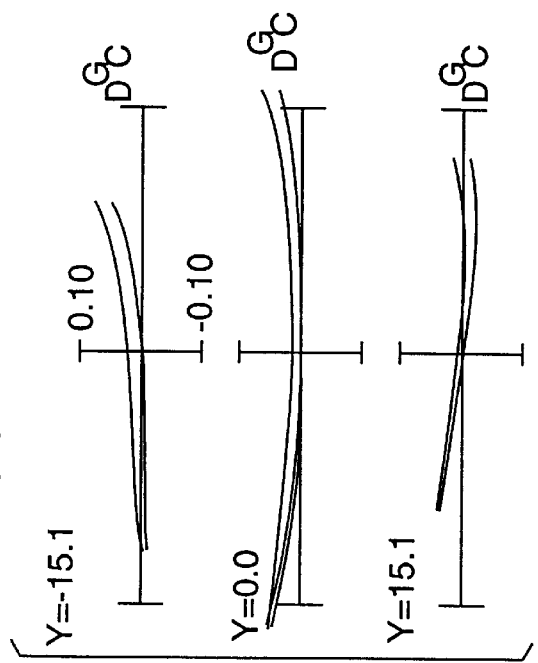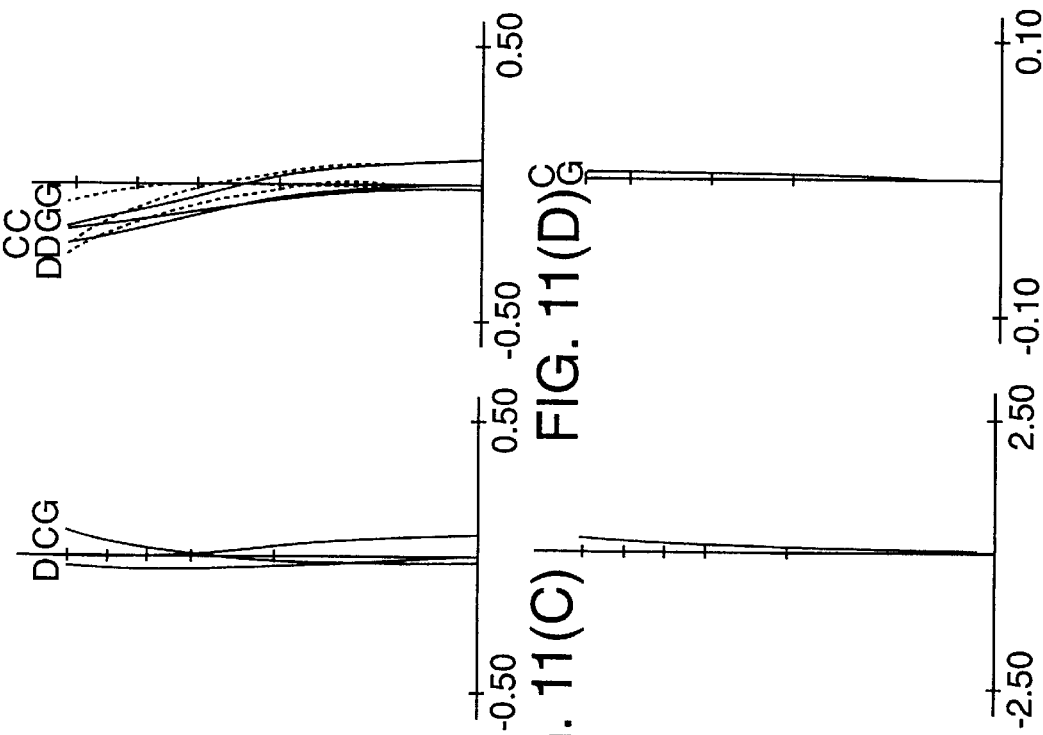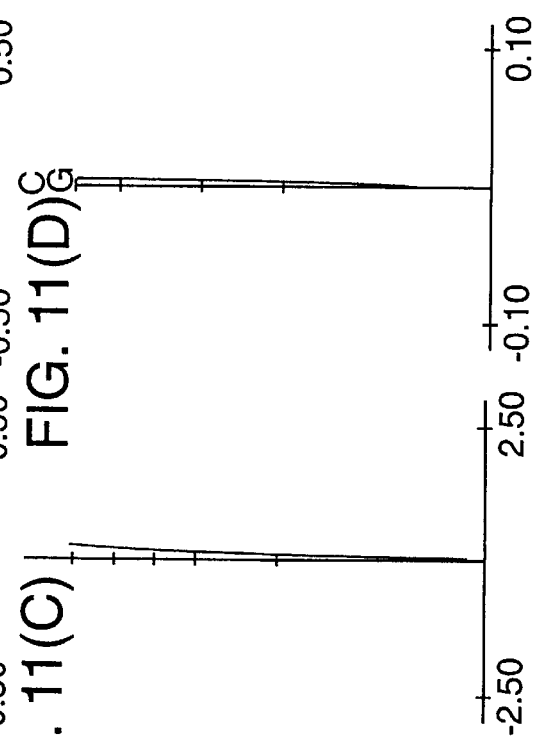

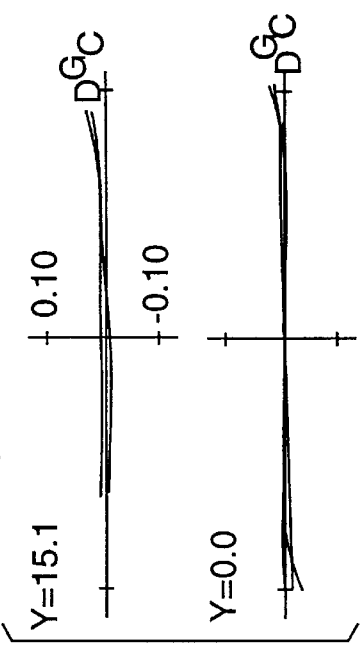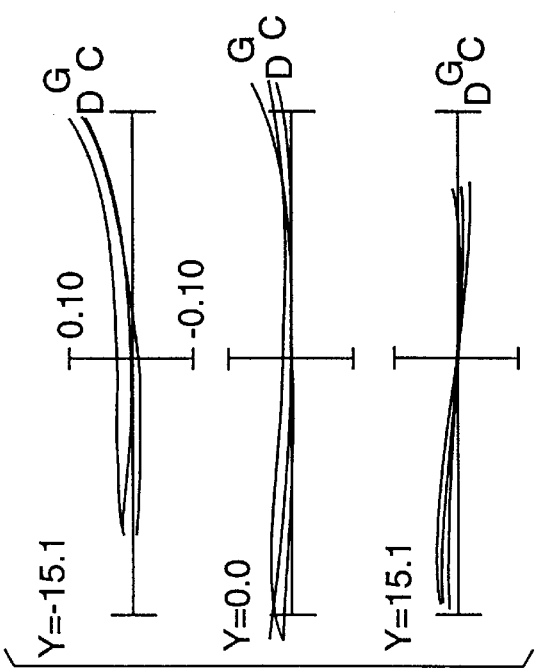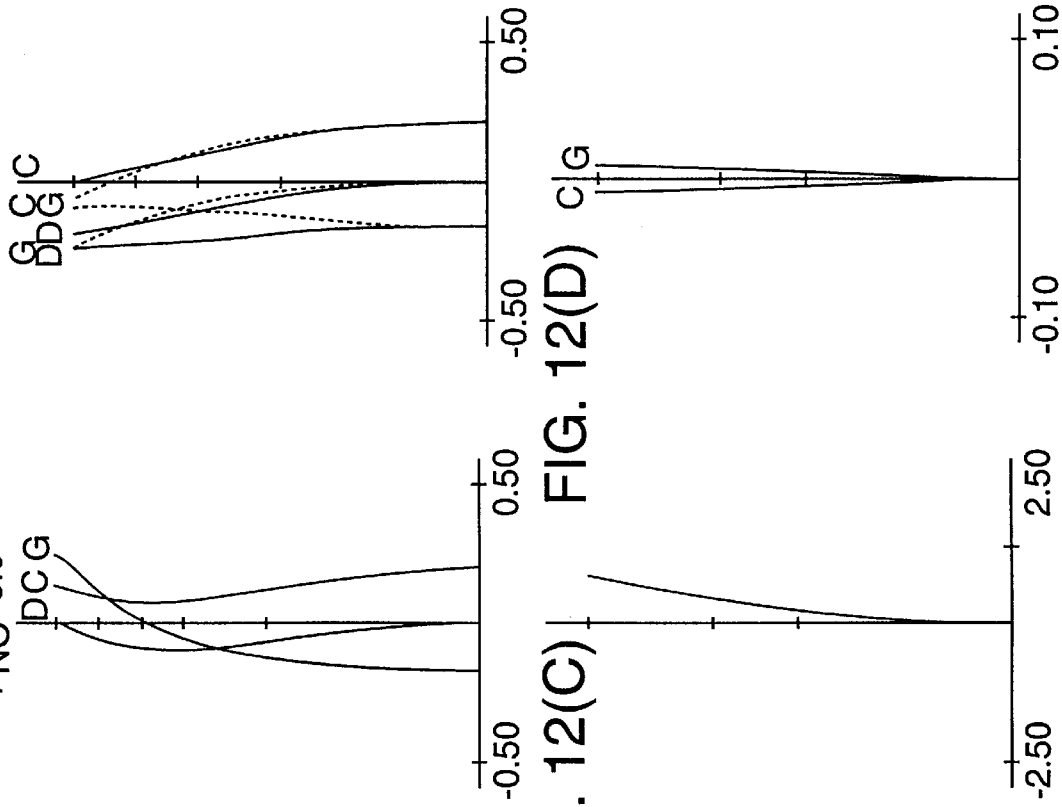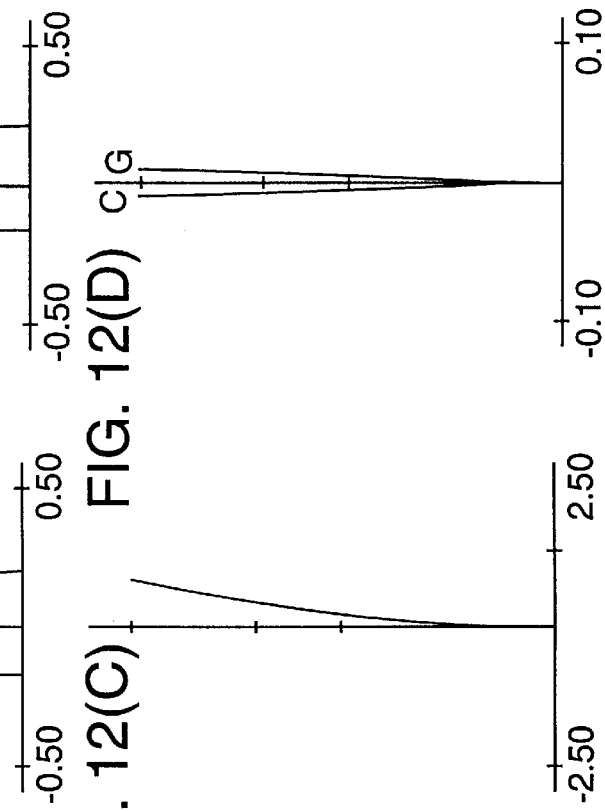

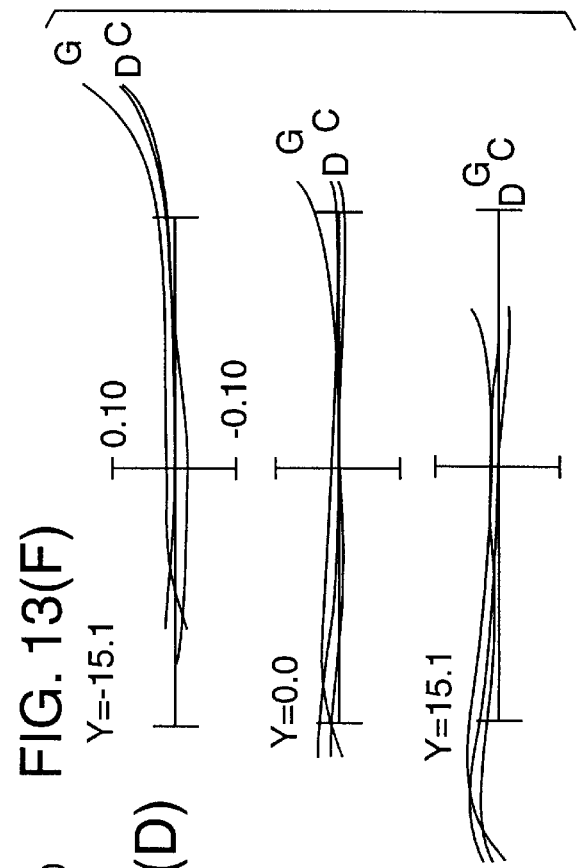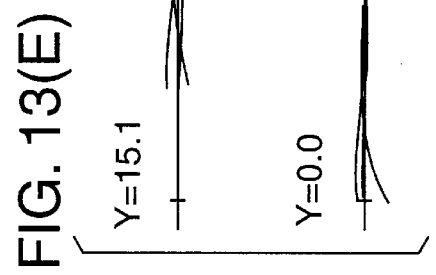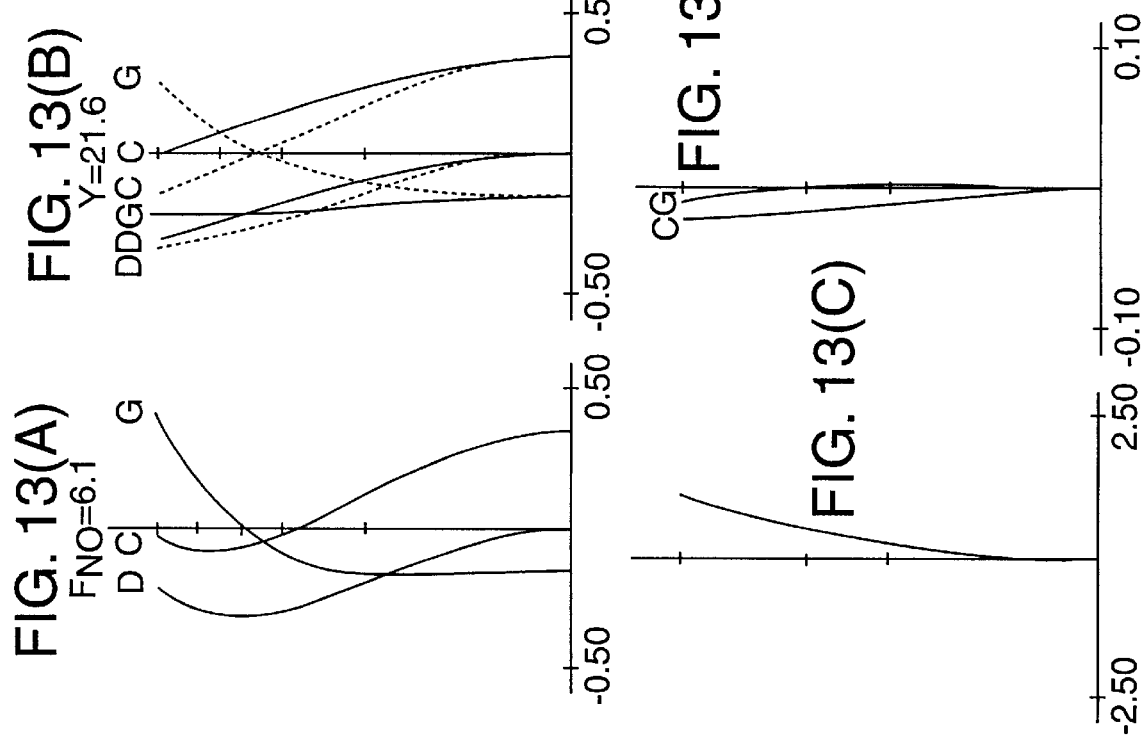

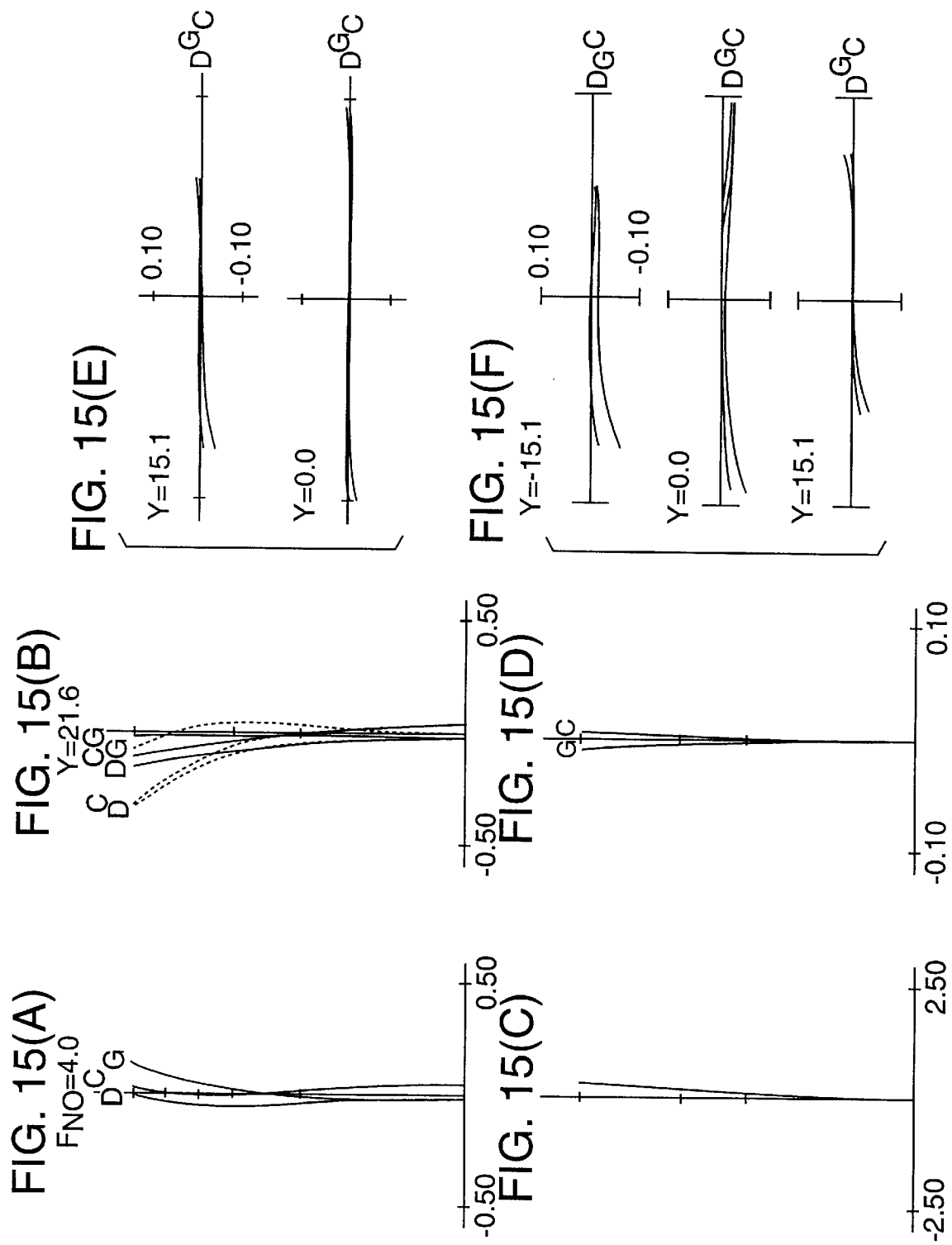

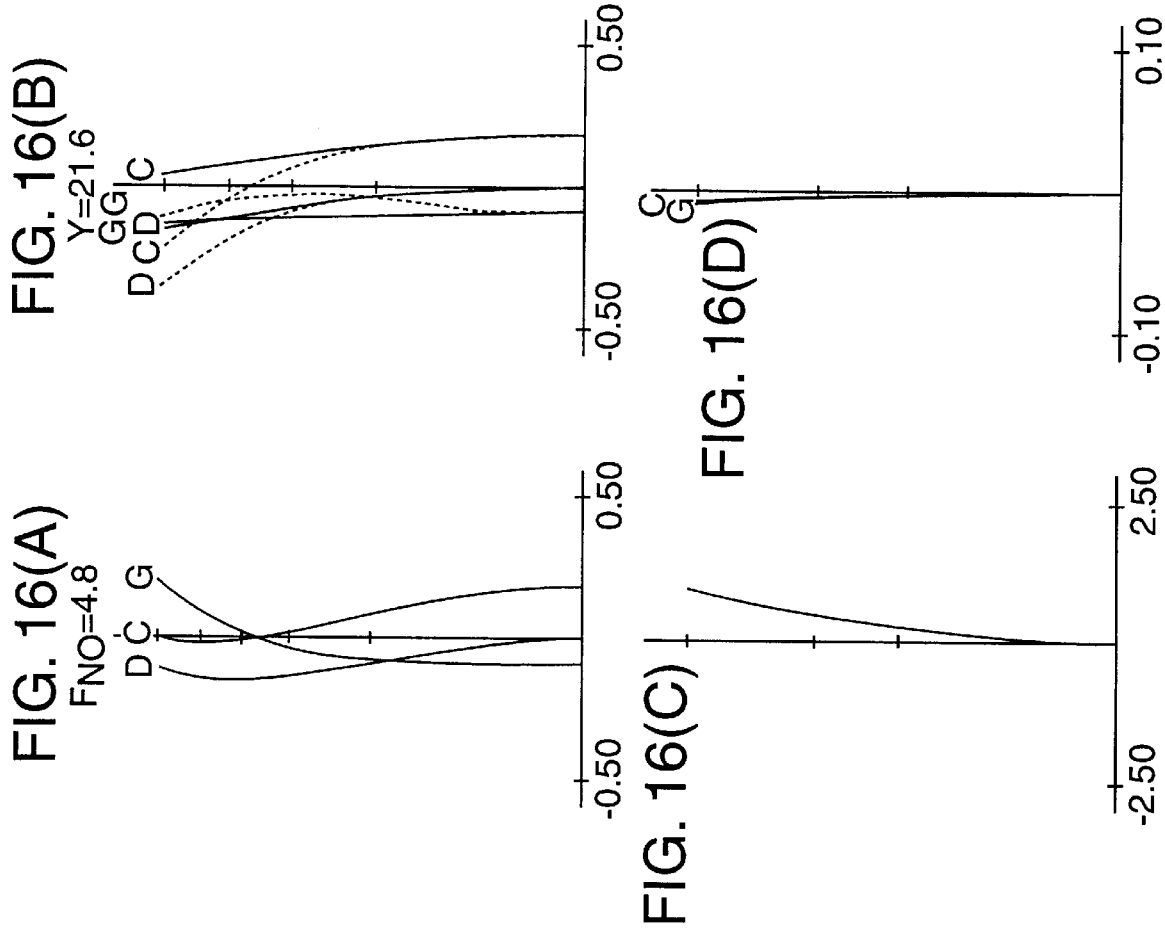

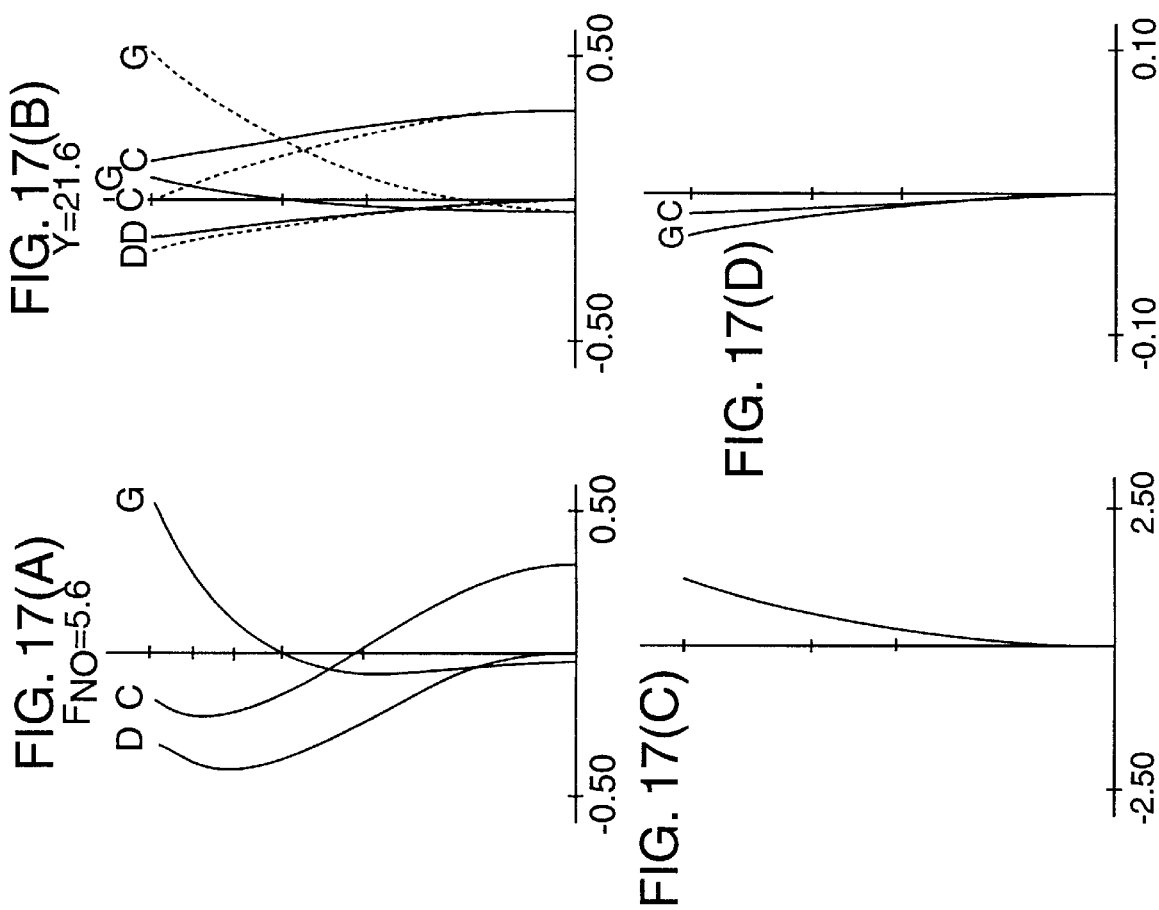
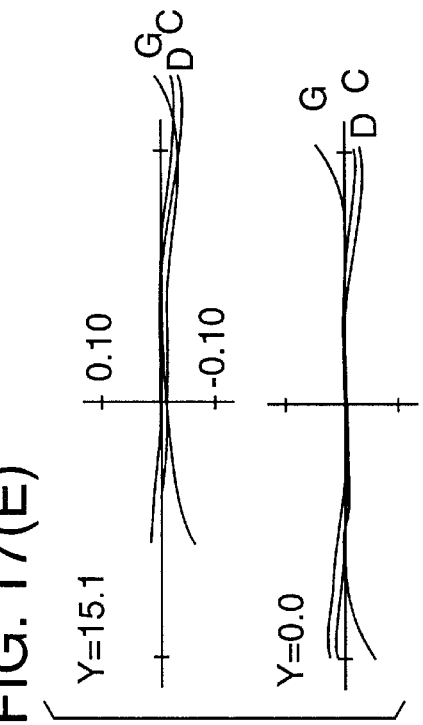
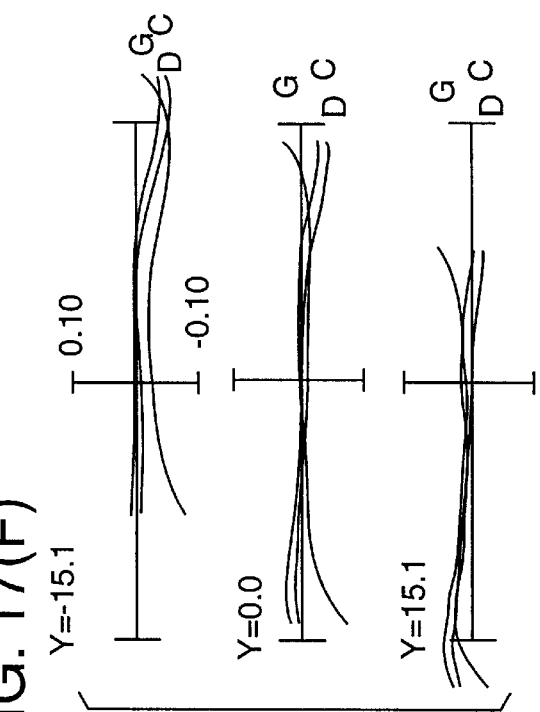

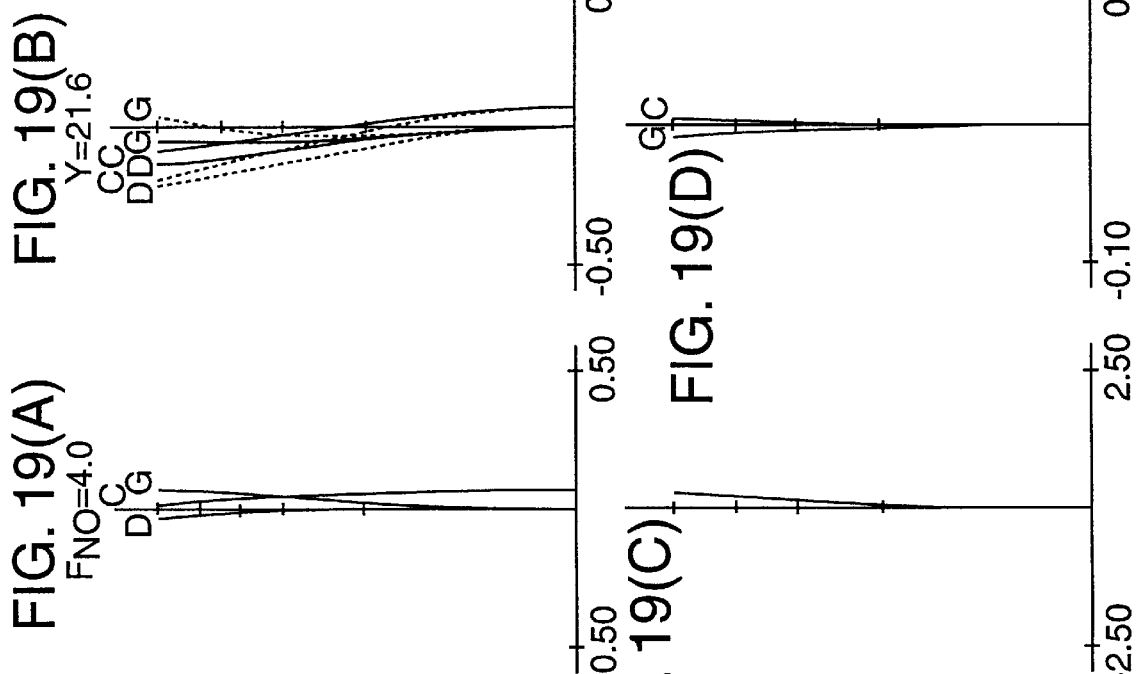
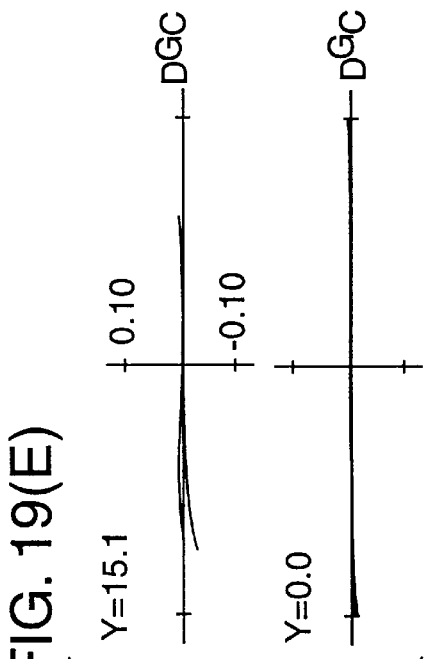
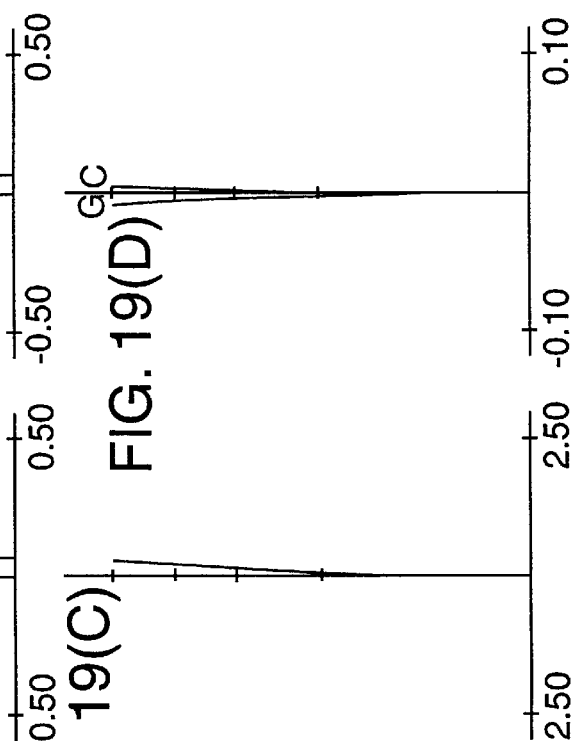
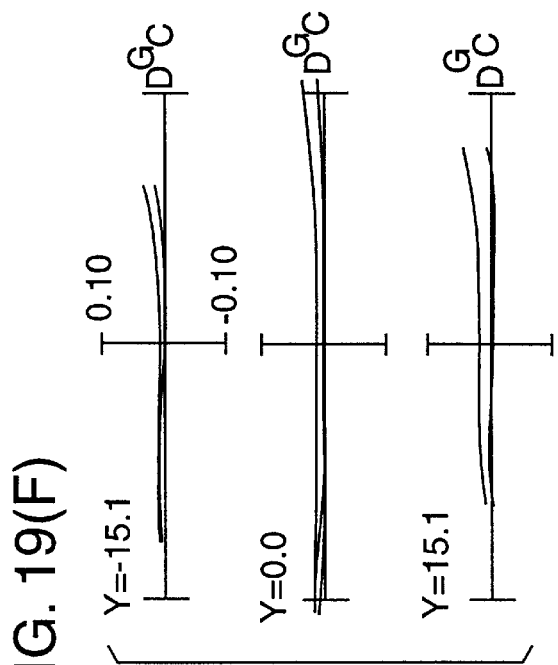

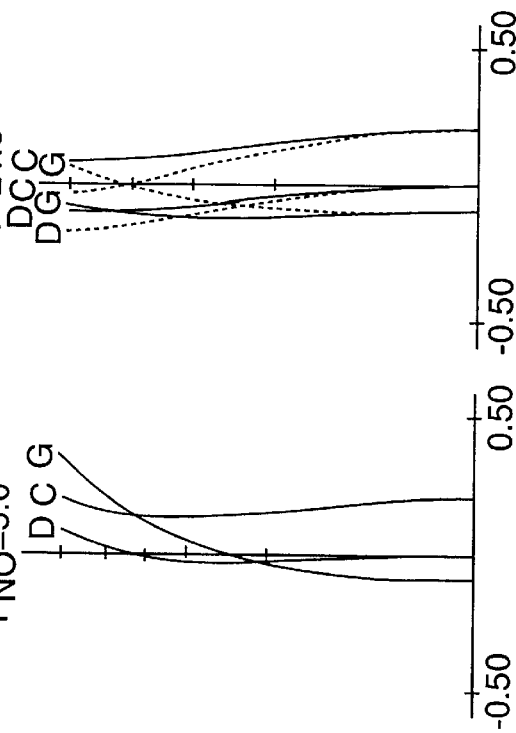
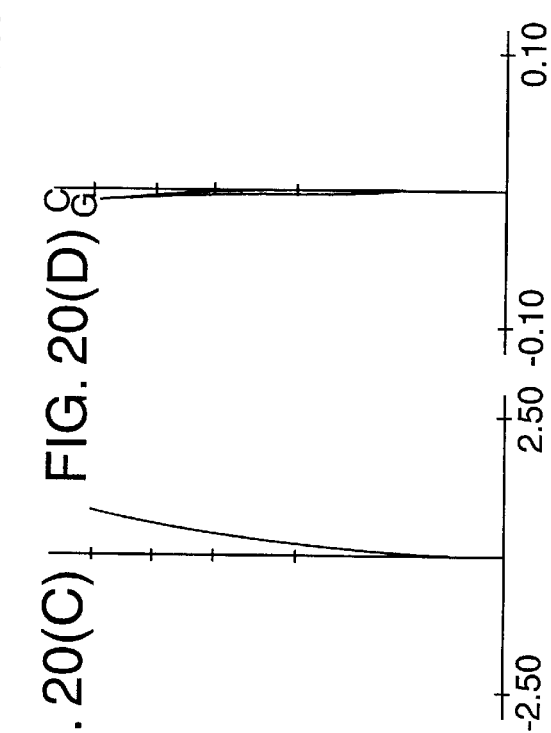
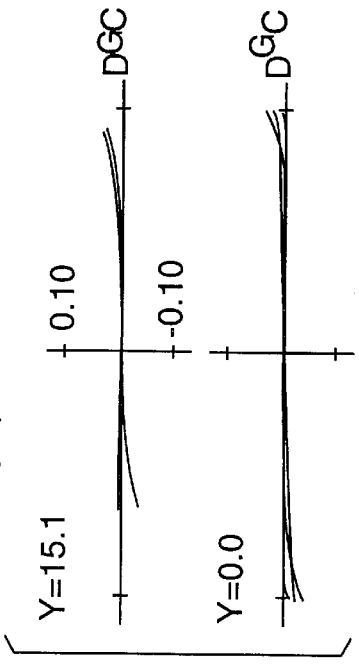
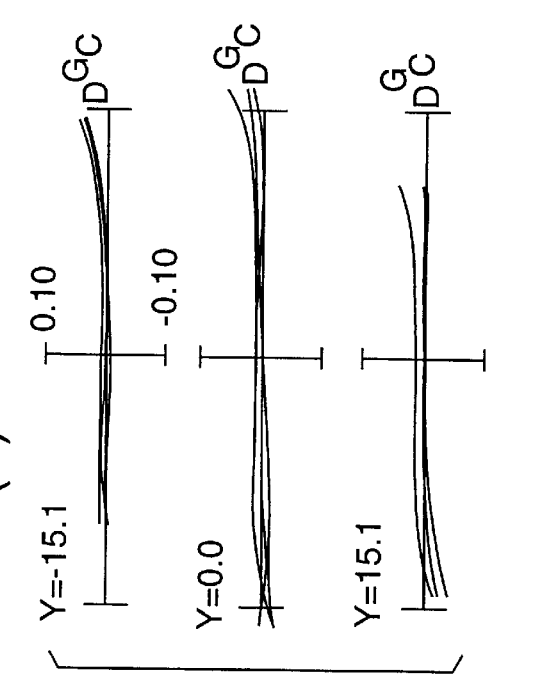

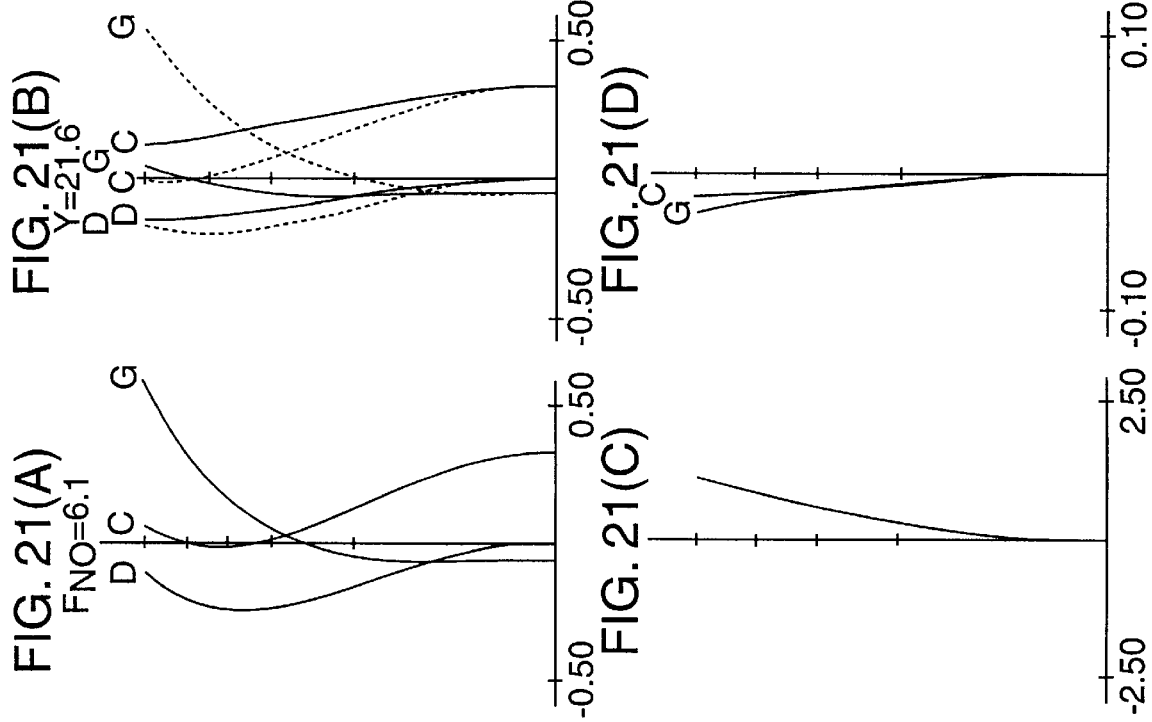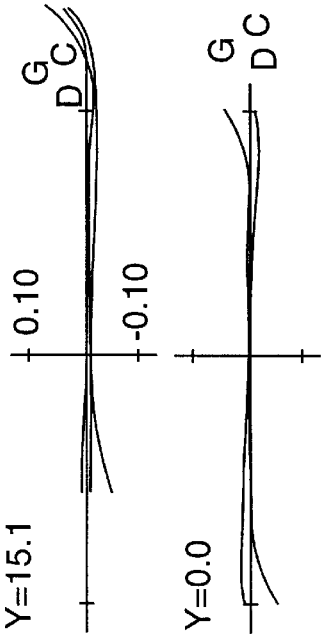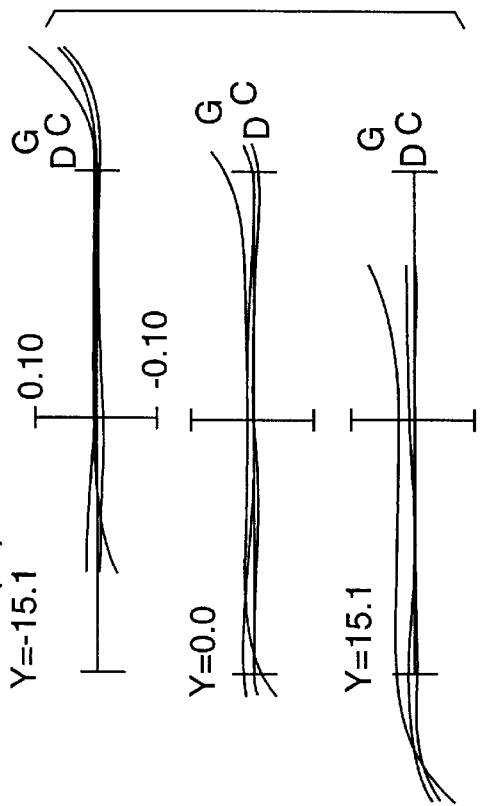

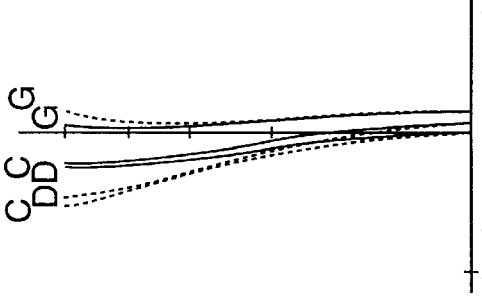
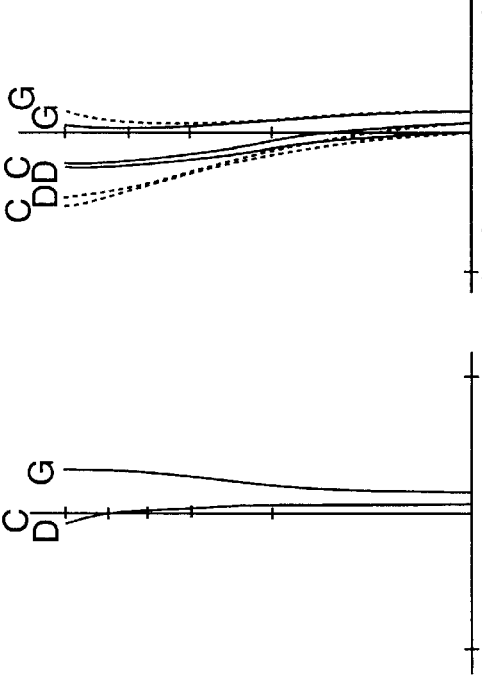
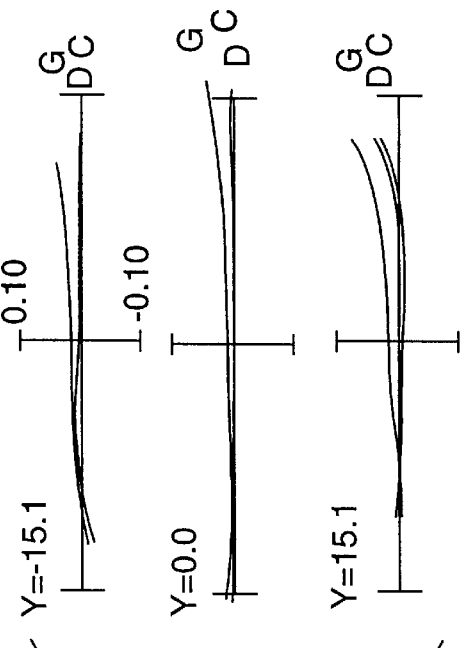
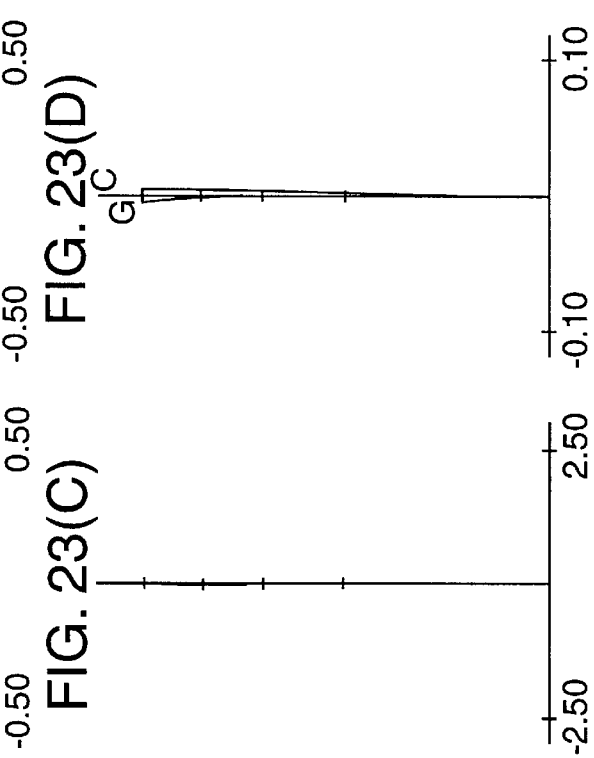

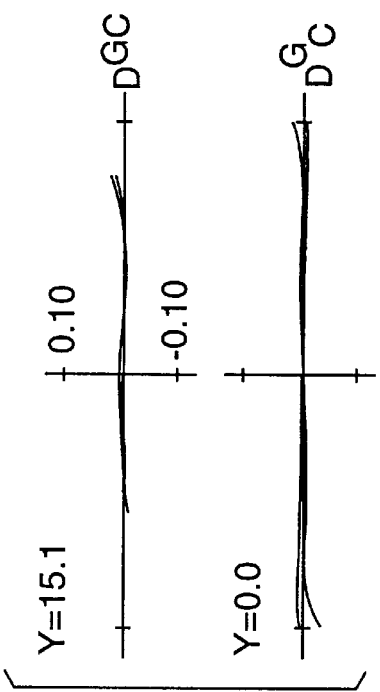
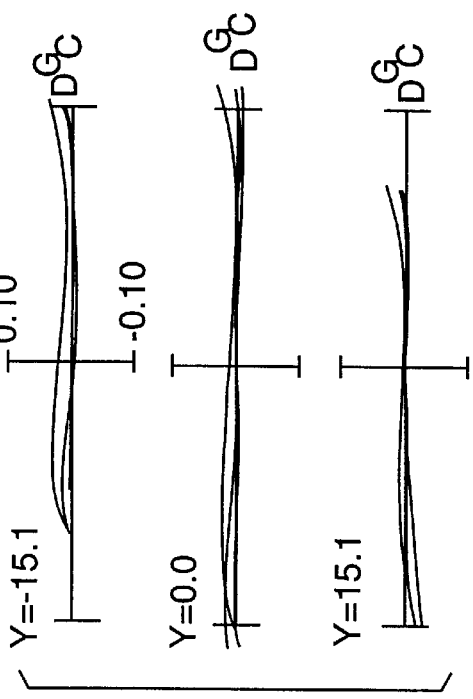
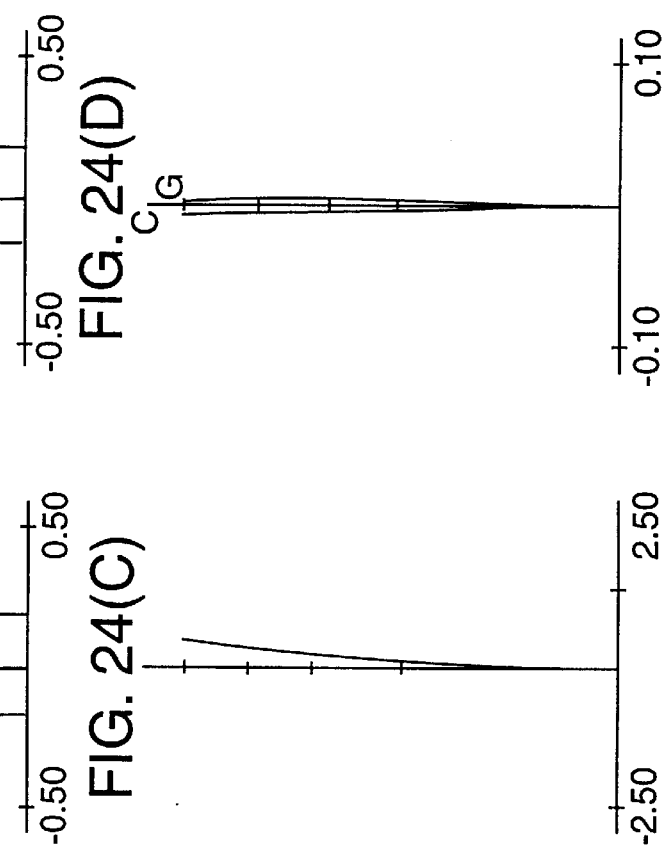
FIG. 24(A)　FIG. 24(B)　FIG. 24(E)　FIG. 24(F)
FIG. 24(C)　FIG. 24(D)

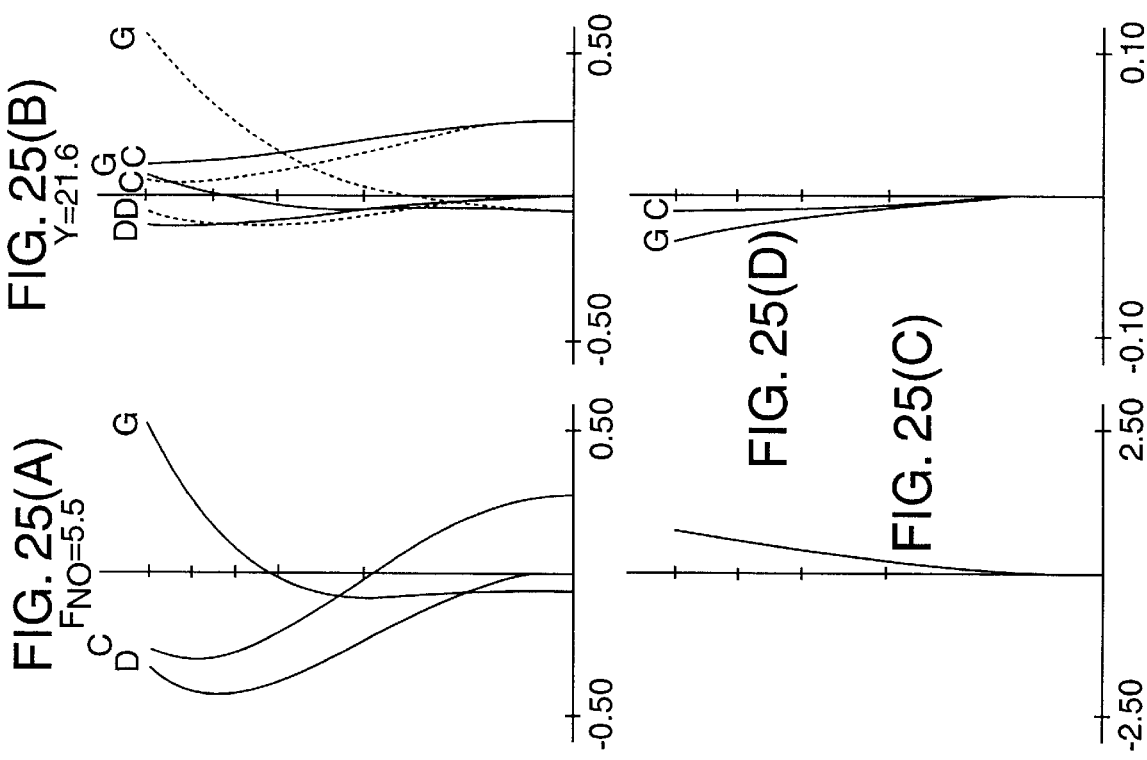

"MACRO" PHOTOGRAPHIC LENS HAVING LONG FOCAL LENGTH AND VIBRATION COMPENSATION

FIELD OF THE INVENTION

This invention pertains to "macro" photographic lenses that have a long focal length (field of view of approximately 18° or less, also termed "telephoto" lenses) and that are operable in a "close-up" range of reproduction ratios.

BACKGROUND OF THE INVENTION

"Macro" photographic lenses (sometimes called "micro" lenses) are used for obtaining close-up photographic images. Macro lenses differ from general-purpose photographic lenses in that macro lenses provide much greater reproduction ratios (ratio of object size to image size). For example, whereas a conventional general-purpose 105-mm telephoto lens for 35-mm photography may allow a maximal reproduction ratio of 1/10 (providing sharp focus of objects as close as about three feet from the lens), a conventional macro 105 mm lens for 35-mm photography can allow a maximal reproduction ratio of 1/1 (providing sharp focus of objects as close as about one inch from the lens). In fact, when using such a macro lens at reproduction ratios of about 1/5 to about 1/1, the photographer frequently sets the desired reproduction ratio (similar to using a zoom lens) and simply moves the camera and lens relative to the object in order to obtain sharp focus. Notwithstanding, such a macro lens can also be used in the same manner as a conventional telephoto lens of the same focal length, providing sharp focusing of objects situated at "infinity" relative to the lens.

A problem with using macro lenses at high reproduction ratios is that virtually any camera movement relative to the object at the time the exposure is made can seriously degrade image quality. One way to minimize such a problem is to use extremely fast exposures, either by controlling shutter speed or using a very fast strobe light. Another way to minimize such a problem is to mount the camera and lens on a tripod or other support.

Various methods have been proposed in the past for providing cameras and lenses with a so-called "antivibration" feature. The antivibration feature typically helps reduce loss of focus and/or image definition that can otherwise arise due to camera and/or lens movements or vibrations encountered during photography. With respect to camera lenses, such a feature has only been included with certain "general-purpose" photographic lenses, i.e., lenses that can focus on objects from infinity to a proximity to the lens at which the reproduction ratio is at most about 1/10. Also, antivibration features have been provided with certain photographic lenses having a field of view of greater than about 18°. This leaves many photographic lenses, particularly those having a field of view of about 18° or less (i.e., within a "telephoto" range in 35-mm photography) and/or macro lenses providing a magnification of at least 1/2, in which an antivibration feature has not been provided for any of various recalcitrant technical reasons.

In addition, with conventional telephoto lenses operable to produce a reproduction ratio of no greater than about 1/10, it is relatively easy to provide sufficient aberration correction for favorable optical performance. In contrast, "macro" lenses require application of rigorous principles of lens configuration and focusing in order to achieve optimal control of aberrations.

A variety of lens-system configurations and focusing methods have been devised that are operable to repress aberration fluctuation at "macro" reproduction-ratio ranges (including reproduction ratios of 1/2 to 1/1 or more). Examples are disclosed in Japan Kôkai Patent Publication No. SHO 55-140810, Japan Kôkai Patent Publication No. SHO 61-132916, Japan Kôkai Patent Publication No. SHO 62-42252, Japan Kôkai Patent Publication No. HEI 2-81014, and Japan Kôkai Patent Publication No. HEI 5-323191. Unfortunately, the lenses disclosed in these references have a number of shortcomings. E.g., certain of the lenses experience an excessive change in overall length whenever the lens is operating in a "macro" range. Other such lenses require an excessive number of lens elements, disadvantageously adding to cost and weight of the lens. Even in contemporary lenses that are internally focusing (i.e., do not experience a change in length when changing focusing), aberrations such as astigmatism and/or distortion become extreme when the reproduction ratio is 1/2 life size or larger.

SUMMARY OF THE INVENTION

The present invention solves the foregoing problems of the prior art by providing a "macro" photographic lens having a focal length providing a field of view of about 18° or less (i.e., a telephoto lens if used for 35-mm photography), a maximal F number of preferably 4 or less, and an antivibration function. The antivibration function is operable to minimize loss of image sharpness caused by, e.g., movement of the camera or lens during photography, while exhibiting good optical performance and minimal aberration fluctuation As "macro" lenses, lenses according to the invention are capable of providing a wide range of reproduction ratio, from a focus at infinity to at least 1/2, preferably to 1/1 or more.

To such end, according to a preferred embodiment, a photographic macro telephoto lens is provided that comprises, in order from the object side, a first lens group having positive refractive power, a second lens group having positive refractive power, a third lens group having negative refractive power, and a fourth lens group having positive refractive power. At least one of the lens groups is movable along the optical axis for focusing the lens. The lens also comprises an antivibration lens element included in one of the lens groups. The antivibration lens element is operable to move transversely relative to the optical axis for compensating for movement of the macro telephoto lens during use of the lens for photography. Such a macro telephoto lens is operable to focus from infinity to a reproduction ratio of at least 1/2, preferably 1/1. The lens also satisfies the Conditional Expression: $0.7 < |\Delta Y/\Delta S| < 1.3$, wherein $\Delta S$ is the amount of transverse movement of the antivibration lens element and $\Delta Y$ is the amount of corresponding movement of an image, formed by the macro telephoto lens on an image plane of the macro telephoto lens, due to the transverse movement of the antivibration lens element.

Further preferably, at least one of the lens groups is stationary in the direction of the optical axis as the macro telephoto lens is being focused. The antivibration lens element is preferably situated in the stationary lens group. Further preferably, the stationary lens group comprises at least five lenses including a compound lens.

Further preferably, the macro telephoto lens also satisfies the Conditional Expression: $0.5 < |f_{dc}/f_p| < 0.9$, wherein $f_{dc}$ is the focal length of the antivibration lens element, and $f_p$ is the focal length of the stationary lens group.

Yet further preferably, the first and third lens groups are movable and the second and fourth lens groups are stationary in the direction of the optical axis as the macro telephoto lens is being focused. In such a configuration, the first lens group is preferably movable in a non-linear fashion and the third lens group is preferably movable toward the image side as the macro telephoto lens is being focused from infinity to close-up.

Finally, the antivibration lens element is preferably situated in the fourth lens group.

The foregoing and additional features and advantages of the invention will be more readily apparent from the following detailed description, which proceeds with reference to the accompanying drawings.

BRIEF DESCRIPTION OF THE DRAWINGS

FIG. 1 is an optical diagram showing general features of a preferred embodiment of a macro lens according to the present invention; motion of the first and third lens groups along the optical axis during focusing from infinity is indicated.

FIG. 2 is an optical diagram showing the specific configuration of lenses in Example Embodiment 1.

FIGS. 3(A)–3(D) provide plots of spherical aberration, astigmatism, distortion, and transverse chromatic aberration, respectively, for Example Embodiment 1 with focus at infinity.

FIG. 3(E) provides a plot of coma for Example Embodiment 1 with focus at infinity and without any transverse displacement of the antivibration lens elements from the optical axis.

FIG. 3(F) provides a plot of coma for Example Embodiment 1 with focus at infinity and with 0.5-mm transverse displacement of the antivibration lens elements from the optical axis.

FIGS. 4(A)–4(D) provide plots of spherical aberration, astigmatism, distortion, and transverse chromatic aberration, respectively, for Example Embodiment 1 with the reproduction ratio set at 1/2.

FIG. 4(E) provides a plot of coma for Example Embodiment 1 with the reproduction ratio set at 1/2 and without any transverse displacement of the antivibration lens elements from the optical axis.

FIG. 4(F) provides a plot of coma for Example Embodiment 1 with the reproduction ratio set at 1/2 and with 0.5-mm transverse displacement of the antivibration lens elements from the optical axis.

FIGS. 5(A)–5(D) provide plots of spherical aberration, astigmatism, distortion, and transverse chromatic aberration, respectively, for Example Embodiment 1 with the reproduction ratio set at 1/1.

FIG. 5(E) provides a plot of coma for Example Embodiment 1 with the reproduction ratio set at 1/1 and without any transverse displacement of the antivibration lens elements from the optical axis.

FIG. 5(F) provides a plot of coma for Example Embodiment 1 with the reproduction ratio set at 1/1 and with 0.5-mm transverse displacement of the antivibration lens elements from the optical axis.

FIGS. 7(A)–7(D) provide plots of spherical aberration, astigmatism, distortion, and transverse chromatic aberration, respectively, for Example Embodiment 2 with focus at infinity.

FIG. 7(E) provides a plot of coma for Example Embodiment 2 with focus at infinity and without any transverse displacement of the antivibration lens element from the optical axis.

FIG. 7(F) provides a plot of coma for Example Embodiment 2 with focus at infinity and with 0.5-mm transverse displacement of the antivibration lens element from the optical axis.

FIGS. 8(A)–8(D) provide plots of spherical aberration, astigmatism, distortion, and transverse chromatic aberration, respectively, for Example Embodiment 2 with the reproduction ratio set at 1/2.

FIG. 8(E) provides a plot of coma for Example Embodiment 2 with the reproduction ratio set at 1/2 and without any transverse displacement of the antivibration lens element from the optical axis.

FIG. 8(F) provides a plot of coma for Example Embodiment 2 with the reproduction ratio set at 1/2 and with 0.5-mm transverse displacement of the antivibration lens element from the optical axis.

FIGS. 9(A)–9(D) provide plots of spherical aberration, astigmatism, distortion, and transverse chromatic aberration, respectively, for Example Embodiment 2 with the reproduction ratio set at 1/1.

FIG. 9(E) provides a plot of coma for Example Embodiment 2 with the reproduction ratio set at 1/1 and without any transverse displacement of the antivibration lens element from the optical axis.

FIG. 9(F) provides a plot of coma for Example Embodiment 2 with the reproduction ratio set at 1/1 and with 0.5-mm transverse displacement of the antivibration lens element from the optical axis.

FIGS. 11(A)–11(D) provide plots of spherical aberration, astigmatism, distortion, and transverse chromatic aberration, respectively, for Example Embodiment 3 with focus at infinity.

FIG. 11(E) provides a plot of coma for Example Embodiment 3 with focus at infinity and without any transverse displacement of the antivibration lens element from the optical axis.

FIG. 11(F) provides a plot of coma for Example Embodiment 3 with focus at infinity and with 0.5-mm transverse displacement of the antivibration lens elements from the optical axis.

FIGS. 12(A)–12(D) provide plots of spherical aberration, astigmatism, distortion, and transverse chromatic aberration, respectively, for Example Embodiment 3 with the reproduction ratio set at 1/2.

FIG. 12(E) provides a plot of coma for Example Embodiment 3 with the reproduction ratio set at 1/2 and without any transverse displacement of the antivibration lens element from the optical axis.

FIG. 12 (F) provides a plot of coma for Example Embodiment 3 with the reproduction ratio set at 1/2 and with 0.5-mm transverse displacement of the antivibration lens element from the optical axis.

FIGS. 13(A)–13(D) provide plots of spherical aberration, astigmatism, distortion, and transverse chromatic aberration, respectively, for Example Embodiment 3 with the reproduction ratio set at 1/1.

FIG. 13(E) provides a plot of coma for Example Embodiment 3 with the reproduction ratio set at 1/1 and without any transverse displacement of the antivibration lens element from the optical axis.

FIG. 13 (F) provides a plot of coma for Example Embodiment 3 with the reproduction ratio set at 1/1 and with 0.5-mm transverse displacement of the antivibration lens element from the optical axis.

FIGS. 15(A)–15(D) provide plots of spherical aberration, astigmatism, distortion, and transverse chromatic aberration, respectively, for Example Embodiment 4 with focus at infinity.

FIG. 15(E) provides a plot of coma for Example Embodiment 4 with focus at infinity and without any transverse displacement of the antivibration lens elements from the optical axis.

FIG. 15(F) provides a plot of coma for Example Embodiment 4 with focus at infinity and with 0.5-mm transverse displacement of the antivibration lens elements from the optical axis.

FIGS. 16(A)–16(D) provide plots of spherical aberration, astigmatism, distortion, and transverse chromatic aberration, respectively, for Example Embodiment 4 with the reproduction ratio set at 1/2.

FIG. 16(E) provides a plot of coma for Example Embodiment 4 with the reproduction ratio set at 1/2 and without any transverse displacement of the antivibration lens elements from the optical axis.

FIG. 16(F) provides a plot of coma for Example Embodiment 4 with the reproduction ratio set at 1/2 and with 0.5-mm transverse displacement of the antivibration lens elements from the optical axis.

FIGS. 17(A)–17(D) provide plots of spherical aberration, astigmatism, distortion, and transverse chromatic aberration, respectively, for Example Embodiment 4 with the reproduction ratio set at 1/1.

FIG. 17(E) provides a plot of coma for Example Embodiment 4 with the reproduction ratio set at 1/1 and without any transverse displacement of the antivibration lens elements from the optical axis.

FIG. 17(F) provides a plot of coma for Example Embodiment 4 with the reproduction ratio set at 1/1 and with 0.5-mm transverse displacement of the antivibration lens elements from the optical axis.

FIGS. 19(A)–19(D) provide plots of spherical aberration, astigmatism, distortion, and transverse chromatic aberration, respectively, for Example Embodiment 5 with focus at infinity.

FIG. 19(E) provides a plot of coma for Example Embodiment 5 with focus at infinity and without any transverse displacement of the antivibration lens element from the optical axis.

FIG. 19(F) provides a plot of coma for Example Embodiment 5 with focus at infinity and with 0.5-mm transverse displacement of the antivibration lens element from the optical axis.

FIGS. 20(A)–20(D) provide plots of spherical aberration, astigmatism, distortion, and transverse chromatic aberration, respectively, for Example Embodiment 5 with the reproduction ratio set at 1/2.

FIG. 20(E) provides a plot of coma for Example Embodiment 5 with the reproduction ratio set at 1/2 and without any transverse displacement of the antivibration lens element from the optical axis.

FIG. 20(F) provides a plot of coma for Example Embodiment 5 with the reproduction ratio set at 1/2 and with 0.5-mm transverse displacement of the antivibration lens element from the optical axis.

FIGS. 21(A)–21(D) provide plots of spherical aberration, astigmatism, distortion, and transverse chromatic aberration, respectively, for Example Embodiment 5 with the reproduction ratio set at 1/1.

FIG. 21(E) provides a plot of coma for Example Embodiment 5 with the reproduction ratio set at 1/1 and without any transverse displacement of the antivibration lens element from the optical axis.

FIG. 21(F) provides a plot of coma for Example Embodiment 5 with the reproduction ratio set at 1/1 and with 0.5-mm transverse displacement of the antivibration lens element from the optical axis.

FIGS. 23(A)–23(D) provide plots of spherical aberration, astigmatism, distortion, and transverse chromatic aberration, respectively, for Example Embodiment 6 with focus at infinity.

FIG. 23(E) provides a plot of coma for Example Embodiment 6 with focus at infinity and without any transverse displacement of the antivibration lens element from the optical axis.

FIG. 23(F) provides a plot of coma for Example Embodiment 6 with focus at infinity and with 0.5-mm transverse displacement of the antivibration lens element from the optical axis.

FIGS. 24(A)–24(D) provide plots of spherical aberration, astigmatism, distortion, and transverse chromatic aberration, respectively, for Example Embodiment 6 with the reproduction ratio set at 1/2.

FIG. 24(E) provides a plot of coma for Example Embodiment 6 with the reproduction ratio set at 1/2 and without any transverse displacement of the antivibration lens element from the optical axis.

FIG. 24(F) provides a plot of coma for Example Embodiment 6 with the reproduction ratio set at 1/2 and with 0.5-mm transverse displacement of the antivibration lens element from the optical axis.

FIGS. 25(A)–25(D) provide plots of spherical aberration, astigmatism, distortion, and transverse chromatic aberration, respectively, for Example Embodiment 6 with the reproduction ratio set at 1/1.

FIG. 25(E) provides a plot of coma for Example Embodiment 6 with the reproduction ratio set at 1/1 and without any transverse displacement of the antivibration lens element from the optical axis.

FIG. 25(F) provides a plot of coma for Example Embodiment 6 with the reproduction ratio set at 1/1 and with 0.5-mm transverse displacement of the antivibration lens element from the optical axis.

DETAILED DESCRIPTION

Figure 6:
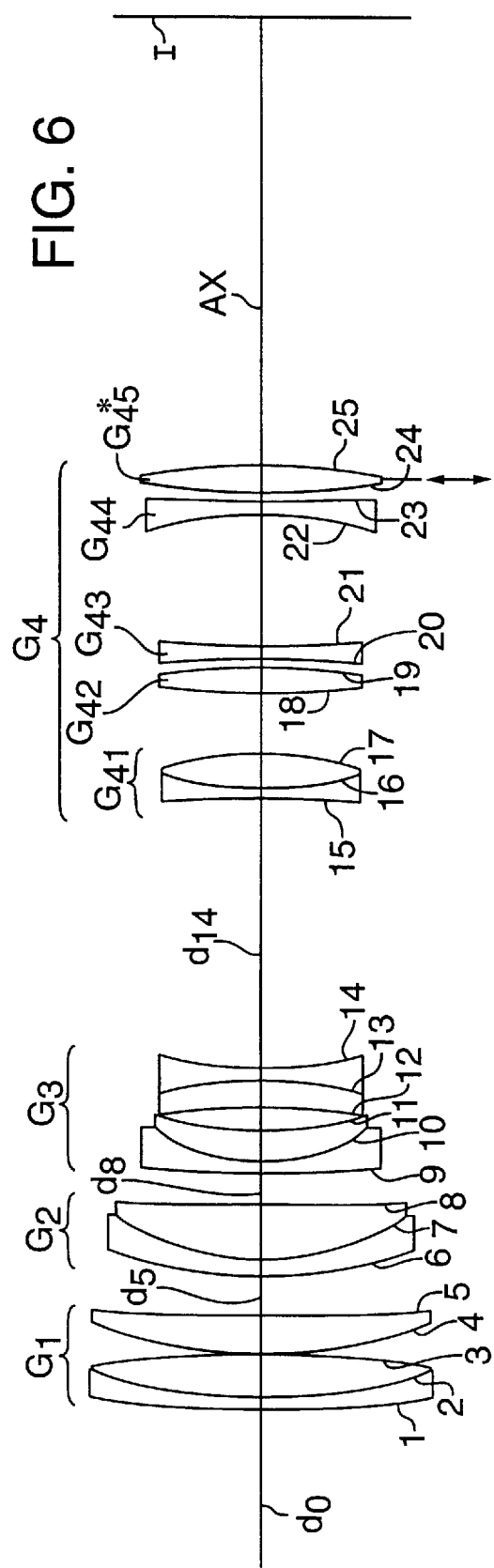
FIG. 6 is an optical diagram showing the specific configuration of lenses in Example Embodiment 2.

FIG. 1 shows general aspect of a lens system according to the present invention. The lens system provides, inter alia, a focal length in a telephoto range, "macro" imaging capability (i.e., capability of producing reproduction ratios from "infinity" to at least 1/2), and antivibration capability. The lens system comprises, in order from the object side and situated on an optical axis AX, a first lens group $G_1$ having positive refractive power, a second lens group $G_2$ having positive refractive power, a third lens group $G_3$ having negative refractive power, and a fourth lens group $G_4$ having positive refractive power.

As shown in FIG. 1, the first lens group $G_1$ and the third lens group $G_3$ are movable along the optical axis AX for focusing. The second lens group $G_2$ and the fourth lens group $G_4$ remain stationary on the optical axis.

The antivibration function is provided by one or more lens elements (termed "antivibration lens elements") preferably located in the fourth lens group $G_4$. While remaining at a fixed location on the optical axis AX, the antivibration lens element(s) are operable to move in a direction perpendicular to the optical axis (i.e., operable to move in a transverse direction) so as to counter the effects of movement or vibration of the lens system during actual use. Mechanical actuation of the antivibration lens element(s) can be performed using any of various such mechanisms known in the art.

The lens system preferably satisfies the following Conditional Expression:

$$0.7 < |\Delta Y / \Delta S| < 1.3 \qquad (1)$$

wherein $\Delta S$ is the amount of transverse movement of the antivibration lens element(s) in the lens system, and $\Delta Y$ is the amount of movement of the image on the image plane I of the lens system due to this transverse movement.

Conditional Expression (1) establishes a desired range for the ratio of $\Delta S$ to $\Delta Y$. Exceeding the upper limit of this Conditional Expression results in the stated ratio becoming too great, while falling below the lower limit results in the stated ratio being too small. Both instances cause excessive difficulty in making antivibration mechanically feasible.

As stated above, the antivibration lens element(s) are situated in a lens group (preferably the fourth lens group $G_4$) that does not undergo any movement in the direction of the optical axis AX during focusing. Such a configuration allows the mechanism required for actuating the antivibration function to be less complicated.

Further preferably, the stationary lens group that includes the antivibration lens element(s) comprises five or more lenses including a cemented compound lens. Such a configuration makes it possible to provide a mechanically favorable antivibration function, to improve the optical performance of the macro lens system, and to minimize fluctuations in optical performance of the macro lens system whenever the antivibration lens element(s) are moved in the transverse direction.

It is also preferable for the following Conditional Expression to be satisfied:

$$0.5 < |f_{dc}/f_p| < 0.9 \qquad (2)$$

wherein $f_{dc}$ is the focal length of the antivibration lens element(s) and $f_p$ is the focal length of the stationary lens group that includes the antivibration lens element(s). Satisfying Conditional Expression 2 provides a macro lens system capable of providing a mechanically favorable antivibration function and improved optical performance. Satisfying Conditional Expression 2 also prevents deterioration of the optical performance of the macro lens system whenever the antivibration lens element(s) is transversely moved. Exceeding the upper limit of Conditional Expression (2) makes it easier for the ratio in Conditional Expression (1) to fall below the lower limit of Conditional Expression (1), making it prohibitively difficult to provide a mechanically favorable antivibration function. Falling below the lower limit of Conditional Expression (2) makes it easier for the upper limit of Conditional Expression (1) to be exceeded; this makes it prohibitively difficult to maintaining overall optical performance of the macro lens system and to achieve minimal fluctuation in optical performance whenever the antivibration lens element(s) is transversely moved.

By constructing the stationary lens group that includes the antivibration lens element(s) of five or more lenses (including a compound lens), it is easier to fulfill both Conditional Expressions (1) and (2) as well as to maintain the essential optical performance of the macro lens system, and easier to minimize fluctuations in optical performance of the macro lens system whenever the antivibration lens element(s) are transversely moved.

It is also preferable, during focusing of the macro lens system from infinity to a close distance, for the second lens group $G_2$ and the fourth lens group $G_4$ to remain stationary on the optical axis, for the first lens group $G_1$ to move in a non-linear fashion along the optical axis, and for the third lens group $G_3$ to move toward the image side. In such a configuration, it is preferable that the antivibration lens element(s) be located in the fourth lens group $G_4$. Such a configuration provides the most favorable optical performance of the macro lens system.

EXAMPLE EMBODIMENTS

Figure 10:
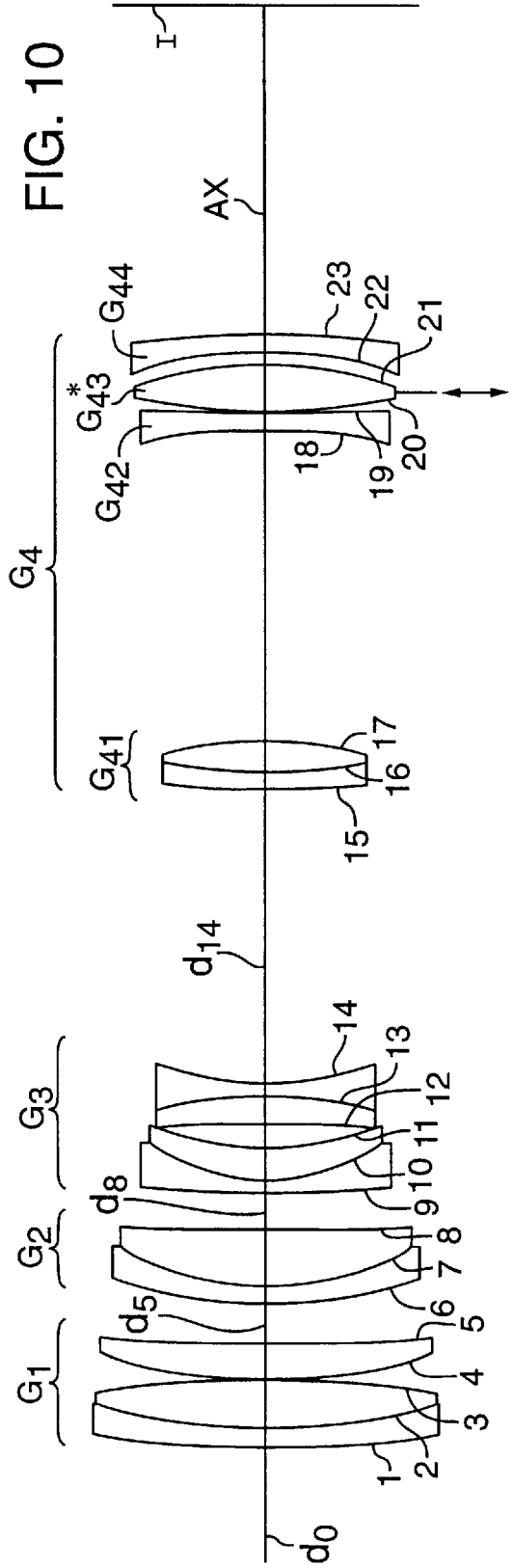
FIG. 10 is an optical diagram showing the specific configuration of lenses in Example Embodiment 3.
Figure 14:
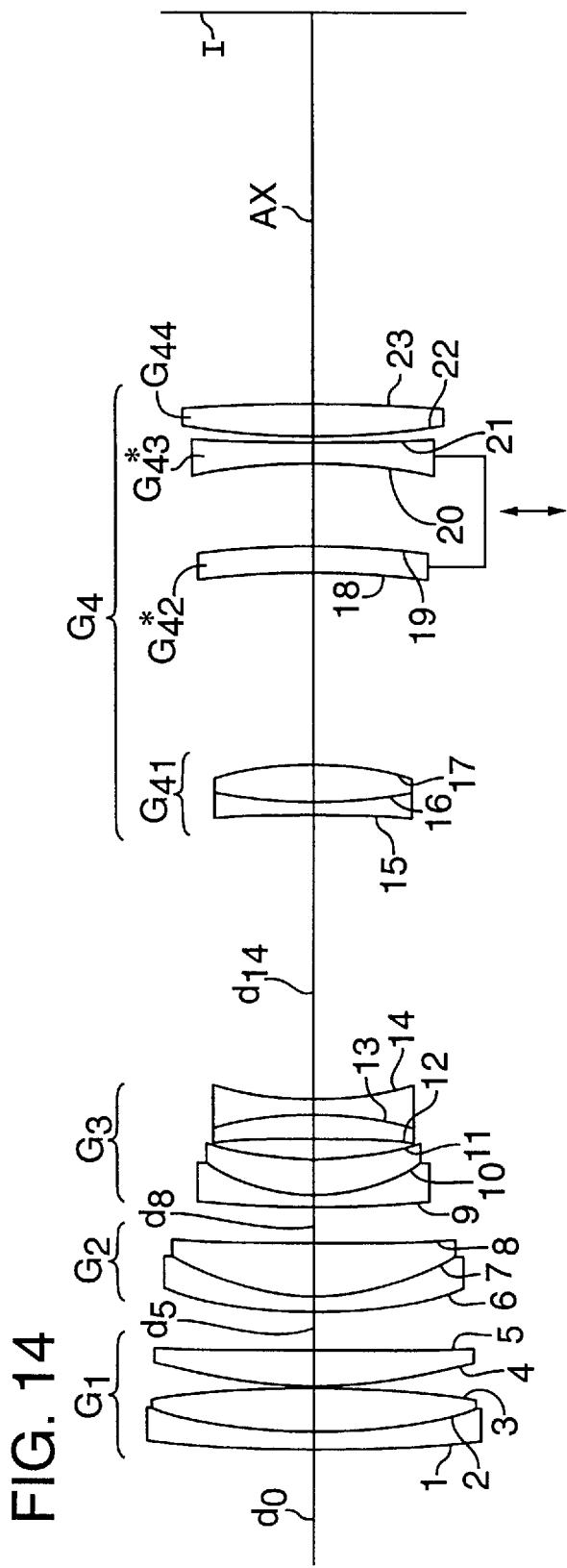
FIG. 14 is an optical diagram showing the specific configuration of lenses in Example Embodiment 4.
Figure 18:
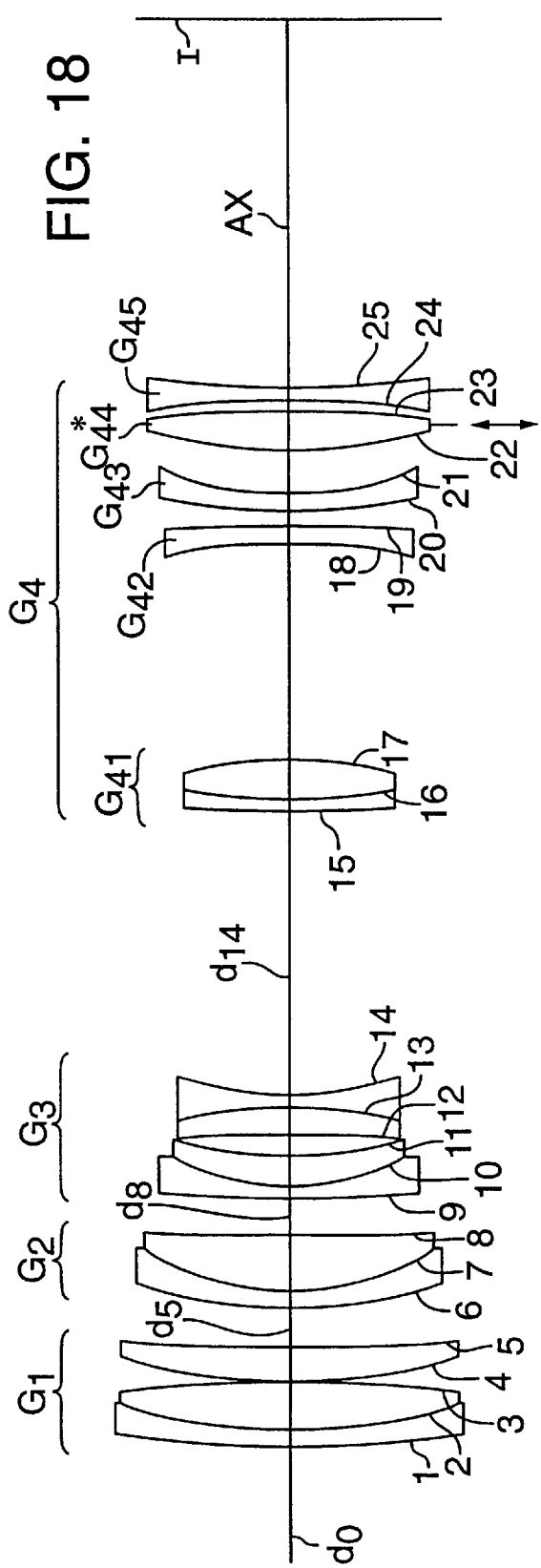
FIG. 18 is an optical diagram showing the specific configuration of lenses in Example Embodiment 5.
Figure 22:
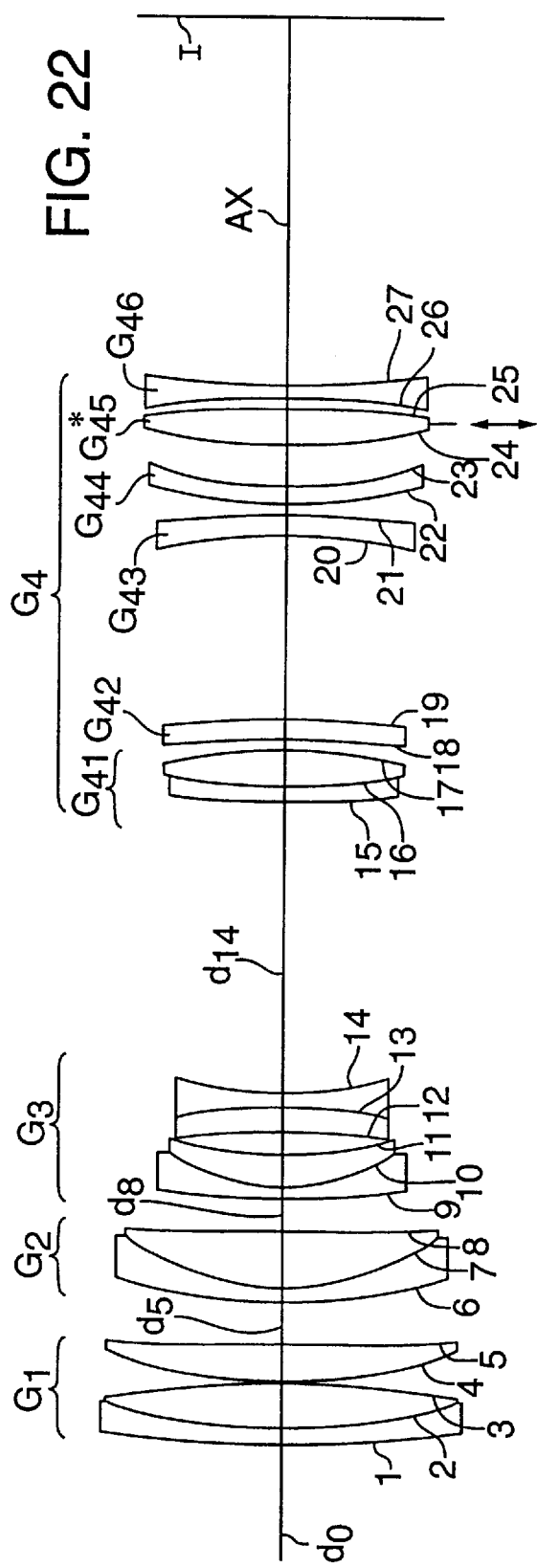
FIG. 22 is an optical diagram showing the specific configuration of lenses in Example Embodiment 6.

FIGS. 2, 6, 10, 14, 18, and 22 provide optical diagrams for Example Embodiments 1–6, respectively. In each of these Example Embodiments, during focusing from infinity to a close distance, the second lens group $G_2$ and the fourth lens group $G_4$ are stationary in the direction of the optical axis AX; the first lens group $G_1$ is movable along the optical axis in a non-linear fashion for focusing, and the third lens group $G_3$ is movable along the optical axis toward the image side for focusing from infinity to close-up.

In addition, in each of these Example Embodiments, the antivibration lens element(s) are situated in the fourth lens group $G_4$. Consequently, where the focal length of the fourth lens group $G_4$ is $f_4$, $f_p = f_4$, wherein $f_p$ is the focal length of the stationary lens group that includes the antivibration lens element(s).

Tables 1–6, below, provide general specifications, lens specifications, optical distance specifications, antivibration data, and values for Conditional Expressions for Example Embodiments 1–6, respectively. In the "General Specifications" section of each Table, f represents the focal length of the lens system, F represents the F number of the lens system, and $2\omega$ is the field of view.

In the "Lens Specifications" section of each Table, the first column presents lens surface numbers beginning on the object side (left side in FIGS. 2, 6, 10, 14, 18, 22), corresponding curvature radii r of the lens surfaces are provided in the second column, axial distances d between adjacent lens surfaces are provided in the third column, respective Abbe numbers $\nu$ (relative to D-line light, $\lambda = 587.6$ nm) for the lenses are provided in the fourth column, respective refractive index values n (relative to D-line light) for the lenses are provided in the fifth column, and corresponding lens-group numbers are provided in the sixth column. Lenses for which an asterisk (*) is included with the lens group number serve as antivibration lens elements and are thus operable to move transversely relative to the optical axis (as shown by the arrow in each of FIGS. 2, 6, 10, 14, 18, 22).

In the "Optical Distance Specifications" section of each Table, $f/\beta$ is the focal length f divided by $\beta$ (image magnification relative to the object), and $d_o$ represents the distance to the object.

In the "Antivibration Data" section of each Table, data are presented regarding the amount of transverse movement of the antivibration lens element(s).

TABLE 1

(Example Embodiment 1, FIG. 2)
General Specifications
f = 180 mm    F = 4.0    2ω = 13.7°
Lens Specifications

| Surface No. | r (mm) | d (mm) | $v_d$ | $n_d$ | Lens Gp |
|---|---|---|---|---|---|
| 1 | 183.237 | 2.25 | 33.9 | 1.80384 | $G_1$ |
| 2 | 77.198 | 6.21 | 82.6 | 1.49782 | $G_1$ |
| 3 | −185.599 | 0.27 | | | |
| 4 | 63.926 | 5.40 | 82.6 | 1.49782 | $G_1$ |
| 5 | 414.662 | $d_5$ | | | |
| 6 | 70.897 | 2.25 | 40.9 | 1.79631 | $G_2$ |
| 7 | 35.866 | 7.88 | 60.7 | 1.60311 | $G_2$ |
| 8 | 428.036 | $d_8$ | | | |
| 9 | 181.702 | 1.80 | 57.0 | 1.62280 | $G_3$ |
| 10 | 28.238 | 4.41 | 33.9 | 1.80384 | $G_3$ |
| 11 | 55.878 | 3.33 | | | |
| 12 | −94.500 | 3.60 | 25.4 | 1.80518 | $G_3$ |
| 13 | −52.470 | 1.80 | 60.3 | 1.62041 | $G_3$ |
| 14 | 44.521 | $d_{14}$ | | | |
| 15 | −302.461 | 1.80 | 32.2 | 1.67270 | $G_{41}$ |
| 16 | 55.800 | 4.95 | 54.0 | 1.61720 | $G_{41}$ |
| 17 | −48.263 | 8.80 | | | |
| 18 | 110.700 | 3.15 | 30.8 | 1.61750 | $G_{42}*$ |
| 19 | 170.614 | 22.35 | | | |
| 20 | −63.000 | 2.25 | 39.6 | 1.80454 | $G_{43}*$ |
| 21 | 468.471 | 1.08 | | | |
| 22 | 109.205 | 4.05 | 45.9 | 1.54814 | $G_{44}$ |
| 23 | −91.261 | | | | |

Optical Distance Specifications

| f/β | $d_0$ (mm) | $d_5$ (mm) | $d_8$ (mm) | $d_{14}$ (mm) |
|---|---|---|---|---|
| 180.0000 | ∞ | 6.0668 | 4.7377 | 40.4283 |
| −0.5000 | 432.2237 | 12.8380 | 16.0231 | 29.1429 |
| −1.0000 | 244.9444 | 5.7795 | 33.4718 | 11.6942 |

Antivibration Data

| | Infinity | 1/2 | 1/1 |
|---|---|---|---|
| Movement of $G_{42}*$ & $G_{43}*$ (mm) | 0.5 | 0.5 | 0.5 |
| Image Movement (mm) | 0.396 | 0.396 | 0.396 |

Conditional Expressions (1) $\Delta Y/\Delta S = 0.792$
(2) $f_{dc}/f_4 = 0.793$.

TABLE 2

(Example Embodiment 2, FIG. 6)
Overall Specifications
f = 180 mm    F = 4.0    2ω = 13.7°
Lens Specifications

| Surface No. | r (mm) | d (mm) | $v_d$ | $n_d$ | Lens Gp |
|---|---|---|---|---|---|
| 1 | 183.237 | 2.25 | 33.9 | 1.80384 | $G_1$ |
| 2 | 77.198 | 6.20 | 82.6 | 1.49782 | $G_1$ |
| 3 | −185.599 | 0.30 | | | |
| 4 | 63.926 | 5.40 | 82.6 | 1.49782 | $G_1$ |
| 5 | 414.660 | $d_5$ | | | |
| 6 | 70.897 | 2.25 | 40.9 | 1.79631 | $G_2$ |
| 7 | 35.866 | 7.90 | 60.7 | 1.60311 | $G_2$ |
| 8 | 428.039 | $d_8$ | | | |
| 9 | 194.013 | 1.80 | 57.0 | 1.62280 | $G_3$ |
| 10 | 28.238 | 4.40 | 33.9 | 1.80384 | $G_3$ |
| 11 | 56.085 | 3.35 | | | |
| 12 | −94.012 | 3.60 | 25.4 | 1.80518 | $G_3$ |
| 13 | −52.470 | 1.80 | 60.3 | 1.62041 | $G_3$ |
| 14 | 45.324 | $d_{14}$ | | | |
| 15 | −298.170 | 1.80 | 32.2 | 1.67270 | $G_{41}$ |
| 16 | 55.800 | 4.95 | 54.0 | 1.61720 | $G_{41}$ |
| 17 | −48.381 | 8.80 | | | |
| 18 | 110.751 | 4.00 | 30.8 | 1.61750 | $G_{42}$ |
| 19 | −104.762 | 1.10 | | | |
| 20 | −98.590 | 2.00 | 30.8 | 1.61750 | $G_{43}$ |
| 21 | 170.315 | 18.91 | | | |
| 22 | −62.962 | 2.25 | 39.6 | 1.80454 | $G_{44}$ |
| 23 | 509.900 | 1.10 | | | |
| 24 | 109.909 | 4.10 | 45.9 | 1.54814 | $G_{45}*$ |
| 25 | −91.101 | | | | |

Optical Distance Specifications

| f/β | $d_0$ (mm) | $d_5$ (mm) | $d_8$ (mm) | $d_{14}$ (mm) |
|---|---|---|---|---|
| 180.0003 | ∞ | 6.0667 | 4.8434 | 40.3395 |
| −0.5000 | 432.1672 | 12.8395 | 16.1314 | 29.0515 |
| −1.0000 | 245.0062 | 6.0639 | 33.4778 | 11.7051 |

Antivibration Data

| | Infinity | 1/2 | 1/1 |
|---|---|---|---|
| Movement of $G_{42}*$ & $G_{43}*$ (mm) | 0.5 | 0.5 | 0.5 |
| Image Movement (mm) | 0.367 | 0.367 | 0.367 |

Conditional Expressions (1) $\Delta Y/\Delta S = 0.734$
(2) $f_{dc}/f_4 = 0.851$.

TABLE 3

(Example Embodiment 3, FIG. 10)
General Specifications
f = 180 mm    F = 4.0    2ω = 13.7°
Lens Specifications

| Surface No. | r (mm) | d (mm) | $v_d$ | $n_d$ | Lens Gp |
|---|---|---|---|---|---|
| 1 | 181.243 | 2.30 | 33.9 | 1.80384 | $G_1$ |
| 2 | 80.554 | 6.40 | 82.6 | 1.49782 | $G_1$ |
| 3 | −184.652 | 0.30 | | | |
| 4 | 66.099 | 5.50 | 82.6 | 1.49782 | $G_1$ |
| 5 | 328.393 | $d_5$ | | | |
| 6 | 73.287 | 2.30 | 40.9 | 1.79631 | $G_2$ |
| 7 | 36.623 | 8.10 | 60.7 | 1.60311 | $G_2$ |
| 8 | 565.583 | $d_8$ | | | |
| 9 | 165.231 | 1.80 | 57.0 | 1.62280 | $G_3$ |
| 10 | 28.834 | 4.60 | 33.9 | 1.80384 | $G_3$ |
| 11 | 57.000 | 3.45 | | | |
| 12 | −97.406 | 3.70 | 25.4 | 1.80518 | $G_3$ |
| 13 | −56.037 | 1.80 | 60.3 | 1.62041 | $G_3$ |
| 14 | 45.132 | $d_{14}$ | | | |
| 15 | 681.031 | 1.80 | 28.3 | 1.72825 | $G_{41}$ |
| 16 | 74.000 | 4.70 | 60.3 | 1.62041 | $G_{41}$ |
| 17 | −54.670 | 43.04 | | | |
| 18 | −63.900 | 2.30 | 49.5 | 1.74443 | $G_{42}$ |
| 19 | 2095.159 | 0.30 | | | |
| 20 | 86.000 | 6.50 | 45.9 | 1.54814 | $G_{43}*$ |
| 21 | −49.964 | 2.00 | | | |
| 22 | −50.049 | 2.30 | 45.1 | 1.74400 | $G_{44}$ |
| 23 | −128.959 | | | | |

Optical Distance Specifications

| f/β | $d_0$ (mm) | $d_5$ (mm) | $d_8$ (mm) | $d_{14}$ (mm) |
|---|---|---|---|---|
| 180.0001 | ∞ | 5.8414 | 4.7927 | 41.4987 |
| −0.5000 | 432.4466 | 12.9846 | 16.6981 | 29.5933 |
| −1.0000 | 244.6013 | 5.8383 | 34.9466 | 11.3448 |

TABLE 3-continued

Antivibration Data

|  | Infinity | 1/2 | 1/1 |
|---|---|---|---|
| Movement of $G_{43}$* (mm) | 0.5 | 0.5 | 0.5 |
| Image Movement (mm) | 0.447 | 0.447 | 0.447 |

Conditional Expressions (1) $\Delta Y/\Delta S = 0.894$ (2) $f_{dc}/f_4 = 0.531$.

TABLE 4

(Example Embodiment 4, FIG. 14)
General Specifications
$f = 180$ mm   $F = 4.0$   $2\omega = 13.7°$

Lens Specifications

| Surface No. | r (mm) | d (mm) | $\nu_d$ | $n_d$ | Lens Gp |
|---|---|---|---|---|---|
| 1 | 183.015 | 2.30 | 33.9 | 1.80384 | $G_1$ |
| 2 | 80.200 | 6.40 | 82.6 | 1.49782 | $G_1$ |
| 3 | −210.359 | 0.30 | | | |
| 4 | 68.300 | 5.50 | 82.6 | 1.49782 | $G_1$ |
| 5 | 696.519 | $d_5$ | | | |
| 6 | 73.297 | 2.30 | 40.9 | 1.79631 | $G_2$ |
| 7 | 36.623 | 8.10 | 60.7 | 1.60311 | $G_2$ |
| 8 | 487.935 | $d_8$ | | | |
| 9 | 204.170 | 1.80 | 58.6 | 1.61272 | $G_3$ |
| 10 | 28.834 | 4.60 | 33.9 | 1.80384 | $G_3$ |
| 11 | 56.720 | 3.40 | | | |
| 12 | −99.800 | 3.70 | 25.4 | 1.80518 | $G_3$ |
| 13 | −56.846 | 1.80 | 60.3 | 1.62041 | $G_3$ |
| 14 | 46.587 | $d_{14}$ | | | |
| 15 | −2925.357 | 1.80 | 28.3 | 1.72825 | $G_{41}$ |
| 16 | 77.000 | 5.50 | 57.0 | 1.62280 | $G_{41}$ |
| 17 | −55.283 | 27.80 | | | |
| 18 | −141.646 | 4.00 | 25.8 | 1.78472 | $G_{42}$* |
| 19 | −96.153 | 12.10 | | | |
| 20 | −63.926 | 2.50 | 39.6 | 1.80454 | $G_{43}$* |
| 21 | 267.372 | 0.85 | | | |
| 22 | 109.199 | 5.00 | 46.8 | 1.76684 | $G_{44}$ |
| 23 | −165.108 | | | | |

Optical Distance Specifications

| f/β | $d_0$ (mm) | $d_5$ (mm) | $d_8$ (mm) | $d_{14}$ (mm) |
|---|---|---|---|---|
| 180.0018 | ∞ | 6.0881 | 4.9909 | 41.2953 |
| −0.5000 | 432.1614 | 13.1805 | 16.8115 | 29.4747 |
| −1.0000 | 244.7331 | 6.6987 | 34.9074 | 10.7682 |

Antivibration Data

|  | Infinity | 1/2 | 1/1 |
|---|---|---|---|
| Movement of $G_{42}$* & $G_{43}$* (mm) | 0.5 | 0.5 | 0.5 |
| Image Movement (mm) | 0.377 | 0.377 | 0.377 |

Conditional Expressions (1) $\Delta Y/\Delta S = 0.754$ (2) $f_{dc}/f_4 = 0.721$.

TABLE 5

(Example Embodiment 5, FIG. 18)
General Specifications
$f = 180$ mm   $F = 4.0$   $2\omega = 13.7°$

Lens Specifications

| Surface No. | r (mm) | d (mm) | $\nu_d$ | $n_d$ | Lens Gp |
|---|---|---|---|---|---|
| 1 | 181.243 | 2.30 | 33.9 | 1.80384 | $G_1$ |
| 2 | 79.786 | 6.40 | 82.6 | 1.49782 | $G_1$ |
| 3 | −188.306 | 0.30 | | | |
| 4 | 66.300 | 5.50 | 82.6 | 1.49782 | $G_1$ |
| 5 | 355.501 | $d_5$ | | | |
| 6 | 73.263 | 2.30 | 40.9 | 1.79631 | $G_2$ |
| 7 | 36.623 | 8.10 | 60.7 | 1.60311 | $G_2$ |
| 8 | 563.591 | $d_8$ | | | |
| 9 | 167.211 | 1.80 | 57.9 | 1.62280 | $G_3$ |
| 10 | 28.834 | 4.60 | 33.9 | 1.80384 | $G_3$ |
| 11 | 57.082 | 3.45 | | | |
| 12 | −97.000 | 3.70 | 25.4 | 1.80518 | $G_3$ |
| 13 | −55.097 | 1.80 | 60.3 | 1.62041 | $G_3$ |
| 14 | 45.166 | $d_{14}$ | | | |
| 15 | 679.626 | 1.80 | 28.3 | 1.72825 | $G_{41}$ |
| 16 | 77.188 | 5.50 | 60.3 | 1.62041 | $G_{41}$ |
| 17 | −53.426 | 31.10 | | | |
| 18 | −70.446 | 2.30 | 49.5 | 1.74443 | $G_{42}$ |
| 19 | −276.727 | 2.30 | | | |
| 20 | 69.150 | 2.50 | 49.7 | 1.55200 | $G_{43}$ |
| 21 | 50.947 | 5.80 | | | |
| 22 | 58.323 | 6.00 | 49.7 | 1.55200 | $G_{44}$* |
| 23 | −102.000 | 1.50 | | | |
| 24 | −100.000 | 2.00 | 49.7 | 1.55200 | $G_{45}$ |
| 25 | 264.330 | | | | |

Optical Distance Specifications

| f/β | $d_0$ (mm) | $d_5$ (mm) | $d_8$ (mm) | $d_{14}$ (mm) |
|---|---|---|---|---|
| 180.0001 | ∞ | 5.9088 | 4.8090 | 40.7581 |
| −0.5000 | 432.3816 | 13.0520 | 16.7144 | 28.8528 |
| −1.0000 | 244.5363 | 5.9058 | 34.9629 | 10.6043 |

Antivibration Data

|  | Infinity | 1/2 | 1/1 |
|---|---|---|---|
| Movement of $G_{42}$* (mm) | 0.5 | 0.5 | 0.5 |
| Image Movement (mm) | 0.440 | 0.440 | 0.440 |

Conditional Expressions (1) $\Delta Y/\Delta S = 0.880$ (2) $f_{dc}/f_4 = 0.618$.

TABLE 6

(Example Embodiment 5, FIG. 22)
General Specifications
$f = 180$ mm   $F = 4.0$   $2\omega = 13.7°$

Lens Specifications

| Surface No. | r (mm) | d (mm) | $\nu_d$ | $n_d$ | Lens Gp |
|---|---|---|---|---|---|
| 1 | 210.652 | 2.30 | 39.6 | 1.80454 | $G_1$ |
| 2 | 80.000 | 6.40 | 82.6 | 1.49782 | $G_1$ |
| 3 | −170.682 | 0.30 | | | |
| 4 | 64.787 | 5.50 | 82.6 | 1.49782 | $G_1$ |
| 5 | 397.531 | $d_5$ | | | |
| 6 | 72.793 | 2.30 | 40.9 | 1.79631 | $G_2$ |
| 7 | 36.623 | 8.10 | 65.5 | 1.60300 | $G_2$ |
| 8 | 529.679 | $d_8$ | | | |
| 9 | 168.000 | 1.80 | 57.0 | 1.62280 | $G_3$ |
| 10 | 28.834 | 4.60 | 33.9 | 1.80384 | $G_3$ |
| 11 | 56.808 | 3.45 | | | |
| 12 | −96.000 | 3.70 | 25.4 | 1.80518 | $G_3$ |

TABLE 6-continued

| | | | | | |
|---|---|---|---|---|---|
| 13 | −55.097 | 1.80 | 60.3 | 1.62041 | $G_3$ |
| 14 | 45.762 | $d_{14}$ | | | |
| 15 | 730.000 | 1.80 | 25.5 | 1.73038 | $G_{41}$ |
| 16 | 80.000 | 5.50 | 60.3 | 1.62041 | $G_{41}$ |
| 17 | −53.426 | 1.40 | | | |
| 18 | −111.123 | 3.00 | 60.3 | 1.62041 | $G_{42}$ |
| 19 | −101.482 | 26.70 | | | |
| 20 | −66.000 | 2.30 | 52.3 | 1.74810 | $G_{43}$ |
| 21 | −297.140 | 2.30 | | | |
| 22 | 60.554 | 2.50 | 53.6 | 1.54739 | $G_{44}$ |
| 23 | 52.500 | 5.80 | | | |
| 24 | 59.507 | 6.00 | 45.9 | 1.54814 | $G_{45}$* |
| 25 | −115.400 | 1.50 | | | |
| 26 | −94.139 | 2.00 | 53.6 | 1.54739 | $G_{46}$ |
| 27 | 262.200 | | | | |

Optical Distance Specifications

| f/β | $d_0$ (mm) | $d_5$ (mm) | $d_8$ (mm) | $d_{14}$ (mm) |
|---|---|---|---|---|
| 180.0056 | ∞ | 6.4345 | 4.7626 | 43.3604 |
| −0.5000 | 431.9330 | 13.5760 | 16.6651 | 31.4579 |
| −1.0000 | 244.0751 | 6.4315 | 34.9099 | 13.2131 |

Antivibration Data

| | Infinity | 1/2 | 1/1 |
|---|---|---|---|
| Movement of $G_{42}$* (mm) | 0.5 | 0.5 | 0.5 |
| Image Movement (mm) | 0.420 | 0.420 | 0.420 |

Conditional Expressions (1) $\Delta Y/\Delta S = 0.839$
(2) $f_{dc}/f_4 = 0.658$.

Plots of spherical aberration, astigmatism, distortion, and transverse chromatic aberration for the lens systems of Example Embodiments 1–6 focused at infinity are provided in FIGS. 3(A)–3(D), 7(A)–7(D), 11(A)–11(D), 15(A)–15(D), 19(A)–19(D), and 23(A)–23(D), respectively. FIGS. 3(E)–3(F), 7(E)–7(F), 11(E)–11(F), 15(E)–15(F), 19(E)–19(F), and 23(E)–23(F) provide plots of coma for Example Embodiments 1–6, respectively, when the antivibration lens element(s) are situated on the optical axis or moved transversely 0.5 mm, respectively, with the subject lens focused at infinity.

Figures 8C, 8D, 8E, 8F:
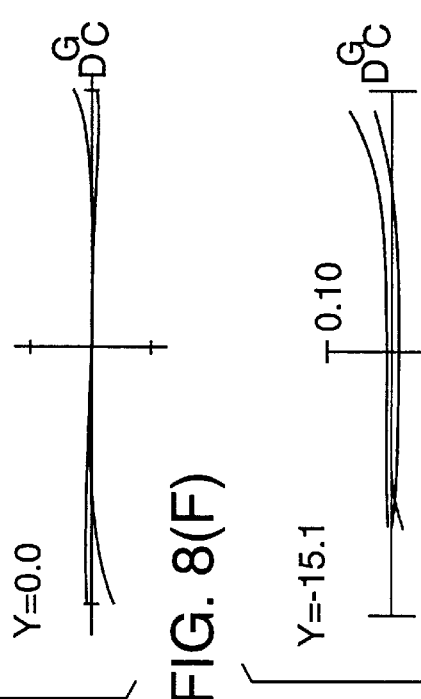

Plots of spherical aberration, astigmatism, distortion, and transverse chromatic aberration for the lens systems of Example Embodiments 1–6 adjusted to produce a 1/2 reproduction ratio are provided in FIGS. 4(A)–4(D), 8(A)–8(D), 12(A)–12(D), 16(A)–16(D), 20(A)–20(D), and 24(A)–24(D), respectively. FIGS. 4(E)–4(F), 8(E)–8(F), 12(E)–12(F), 16(E)–16(F), 20(E)–20(F), and 24(E)–24(F) provide plots of coma for Example Embodiments 1–6, respectively, when the antivibration lens element(s) are situated on the optical axis or moved transversely 0.5 mm, respectively, with the subject lens system adjusted to produce a 1/2 reproduction ratio.

With respect to the subject lens system adjusted to produce a 1/1 reproduction ratio, plots of spherical aberration, astigmatism, distortion, and transverse chromatic aberration for Example Embodiments 1–6 are provided in FIGS. 5(A)–5(D), 9(A)–9(D), 13(A)–13(D), 17(A)–17(D), 21(A)–21(D), and 25(A)–25(D), respectively. FIGS. 5(E)–5(F), 9(E)–9(F), 13(E)–13(F), 17(E)–17(F), 21(E)–21(F), and 25(E)–25(F) provide plots of coma for Example Embodiments 1–6, respectively, when the antivibration lens element(s) are situated on the optical axis or moved transversely 0.5 mm, respectively.

In the various aberration plots, $F_{NO}$ denotes the F number and Y denotes the image height. In the astigmatism plots, the solid line indicates the sagittal image plane and the dashed line indicates the meridional image plane.

As is clear from the various aberration plots, macro lenses are provided according to the present invention that exhibit superior imaging performance and vibration compensation, while satisfying Conditional Expressions (1) and (2).

Whereas the invention has been described in connection with a preferred embodiments and multiple Example Embodiments, the invention is not limited to those embodiments. On the contrary, the invention is intended to encompass all alternatives, modifications, and equivalents as may be included within the spirit and scope of the invention as defined by the appended claims.

What is claimed is:

1. A photographic macro telephoto lens, comprising in order from the object side:

(a) a first lens group $G_1$ with a positive refractive power, a second lens group $G_2$ with a positive refractive power, a third lens group $G_3$ with a negative refractive power, and a fourth lens group $G_4$ with a positive refractive power, at least one of the lens groups being movable along an optical axis for focusing, at least one of the lens groups being stationary in the direction of the optical axis as the macro telephoto lens is being focused, and the stationary lens group comprising at least five lenses including a compound lens;

(b) an antivibration lens element included in the stationary lens group, the antivibration lens element being operable to move transversely relative to the optical axis for compensating for movement of the macro telephoto lens during use of the lens for photography;

(c) the macro telephoto lens being operable to focus from infinity to a reproduction ratio of at least 1/2; and (d) the macro telephoto lens satisfying the conditional expression $$0.7<|\Delta Y/\Delta S|<1.3$$

wherein $\Delta S$ is the amount of transverse movement of the antivibration lens element and $\Delta Y$ is the amount of corresponding movement of an image, formed by the macro telephoto lens on an image plane of the macro telephoto lens, due to the transverse movement of the antivibration lens element.

2. The lens of claim 1, further satisfying the Conditional Expression:

$$0.5<|f_{dc}/f_p|<0.9$$

wherein $f_{dc}$ is the focal length of the antivibration lens element, and $f_p$ is the focal length of the stationary lens group.

3. The lens of claim 1, wherein the first and third lens groups are movable and the second and fourth lens groups are stationary in the direction of the optical axis as the macro telephoto lens is being focused.

4. The lens of claim 3, wherein the first lens group is movable in a non-linear fashion and the third lens group is movable toward the image side as the macro telephoto lens is being focused from infinity to close-up.

5. The lens of claim 4, wherein the antivibration lens element is in the fourth lens group.

6. The lens of claim 1, having a maximal F number of at least 4.

7. The lens of claim 1 operable to focus from infinity to a reproduction ratio of 1/1.

8. A photographic macro telephoto lens, comprising in order from the object side:

(a) a first lens group $G_1$ with a positive refractive power, a second lens group $G_2$ with a positive refractive power, a third lens group $G_3$ with a negative refractive power, and a fourth lens group $G_4$ with a positive refractive power, at least one of the lens groups being movable along an optical axis for focusing, and at least one of the lens groups being stationary in the direction of the optical axis as the macro telephoto lens is being focused;

(b) an antivibration lens element included in the stationary lens group, the antivibration lens element being operable to move transversely relative to the optical axis for compensating for movement of the macro telephoto lens during use of the lens for photography;

(c) the macro telephoto lens being operable to focus from infinity to a reproduction ratio of at least 1/2; and (d) the macro telephoto lens satisfying the conditional expressions $$0.7 < |\Delta Y/\Delta S| < 1.3$$

$$0.5 < |f_{dc}/f_p| < 0.9$$

wherein $f_{dc}$ is the focal length of the antivibration lens element, $f_p$ is the focal length of the stationary lens group, $\Delta S$ is the amount of transverse movement of the antivibration lens element, and $\Delta Y$ is the amount of corresponding movement of an image, formed by the macro telephoto lens on an image plane of the macro telephoto lens, due to the transverse movement of the antivibration lens element.

9. The lens of claim 8, wherein the first and third lens groups are movable and the second and fourth lens groups are stationary in the direction of the optical axis as the macro telephoto lens is being focused.

10. The lens of claim 9, wherein the first lens group is movable in a non-linear fashion and the third lens group is movable toward the image side as the macro telephoto lens is being focused from infinity to close-up.

11. The lens of claim 10, wherein the antivibration lens element is in the fourth lens group.

12. The lens of claim 8, having a maximal F number of at least 4.

13. The lens of claim 8 operable to focus from infinity to a reproduction ratio of 1/1.

* * * * *

UNITED STATES PATENT AND TRADEMARK OFFICE
CERTIFICATE OF CORRECTION

PATENT NO.   : 5,825,546
DATED        : October 20, 1998
INVENTOR(S)  : SEI MATSUI It is certified that error appears in the above-indentified patent and that said Letters Patent is hereby corrected as shown below:

Column 2, line 29, insert a period --.-- after "fluctuation" and before "As".

Column 10, line 24, Table 2, "Movement of $G_{42}$* & $G_{43}$* (mm)" should be --Movement of $G_{45}$* (mm)--.

Column 12, line 41, Table 5, "Movement of $G_{42}$* (mm)" should be --Movement of $G_{44}$* (mm)--.

Column 12, line 51, Table 6, "Example Embodiment 5" should be --Example Embodiment 6--.

Column 13, line 26, Table 6, "Movement of $G_{42}$* (mm)" should be --Movement of $G_{45}$* (mm).

Signed and Sealed this

Ninth Day of November, 1999

Q. TODD DICKINSON

Attest:

Attesting Officer

Acting Commissioner of Patents and Trademarks